(12) United States Patent
Minato et al.

(10) Patent No.: US 11,512,622 B2
(45) Date of Patent: Nov. 29, 2022

(54) EXHAUST GAS SENSOR

(71) Applicant: DENSO CORPORATION, Kariya (JP)

(72) Inventors: Masato Minato, Kariya (JP); Masato Katsuno, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/535,883

(22) Filed: Nov. 26, 2021

(65) Prior Publication Data

US 2022/0082044 A1 Mar. 17, 2022

Related U.S. Application Data

(63) Continuation of application No. PCT/JP2020/021260, filed on May 29, 2020.

(30) Foreign Application Priority Data

May 29, 2019 (JP) .............................. JP2019-100209

(51) Int. Cl.
*F01N 11/00* (2006.01)
*G01N 27/04* (2006.01)
(52) U.S. Cl.
CPC ............ *F01N 11/00* (2013.01); *G01N 27/04* (2013.01); *F01N 2560/02* (2013.01); *F01N 2560/20* (2013.01)
(58) Field of Classification Search
CPC .. F01N 11/00; F01N 2560/02; F01N 2560/20; F01N 2550/24; F01N 2560/06; G01N 27/04; Y02T 10/40; F02D 45/00
See application file for complete search history.

(56) References Cited

U.S. PATENT DOCUMENTS

2012/0120981 A1\* 5/2012 Genssle .............. F02D 41/1466
73/1.06
2013/0145815 A1 6/2013 Nishijima

FOREIGN PATENT DOCUMENTS

JP 2007-2700 1/2007
JP 2007002700 A \* 1/2007 ......... F02D 41/1446

OTHER PUBLICATIONS

Machine Translation of JP-2007002700-A (Year: 2007).\*

\* cited by examiner

*Primary Examiner* — Brandon D Lee
(74) *Attorney, Agent, or Firm* — Nixon & Vanderhye P.C.

(57) ABSTRACT

An exhaust gas sensor that detects a specific component included in an exhaust gas includes a sensor element including a detector, an element cover that accommodates the sensor element and has a gas ventilation hole, a heater that heats the sensor element, a heater control section, and an installation state diagnosis section that diagnoses a state of an element cover based on a sensor temperature detected by a sensor temperature detection section. The installation state diagnosis section includes a temperature variation amount calculation section that calculates a sensor temperature variation amount, a temperature variation amount integration section that sums the sensor temperature variation amounts, and an abnormality determination section that determines presence or absence of an abnormal installation based on a comparison result between variation amount integration information of the sensor temperature and a diagnosis threshold value.

8 Claims, 13 Drawing Sheets

FIG.5
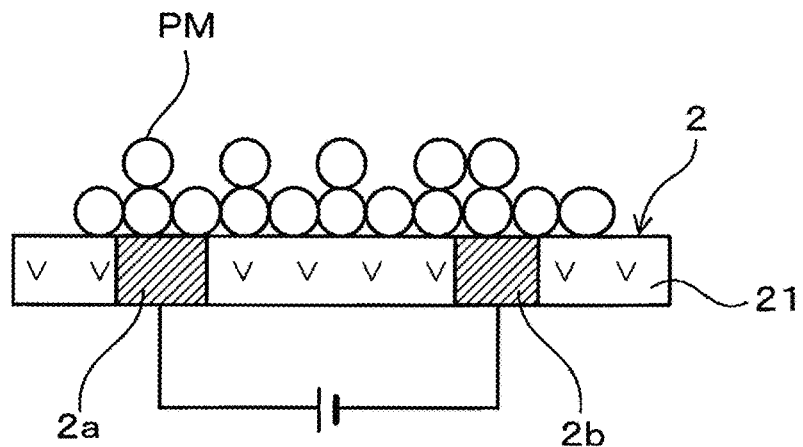
FIG.6
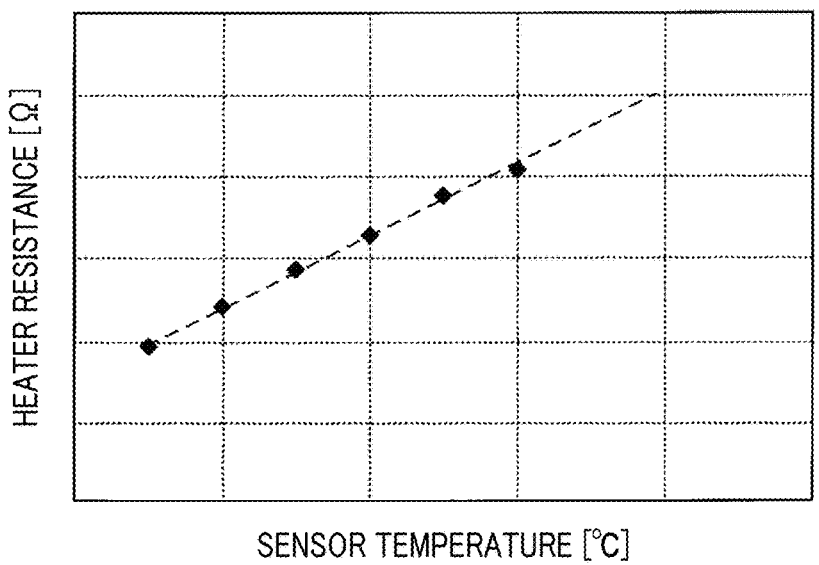
SENSOR TEMPERATURE [°C]
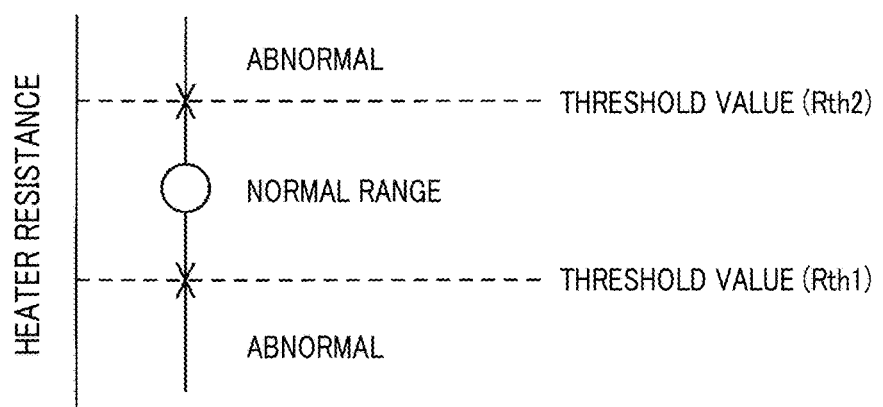

FIG.13
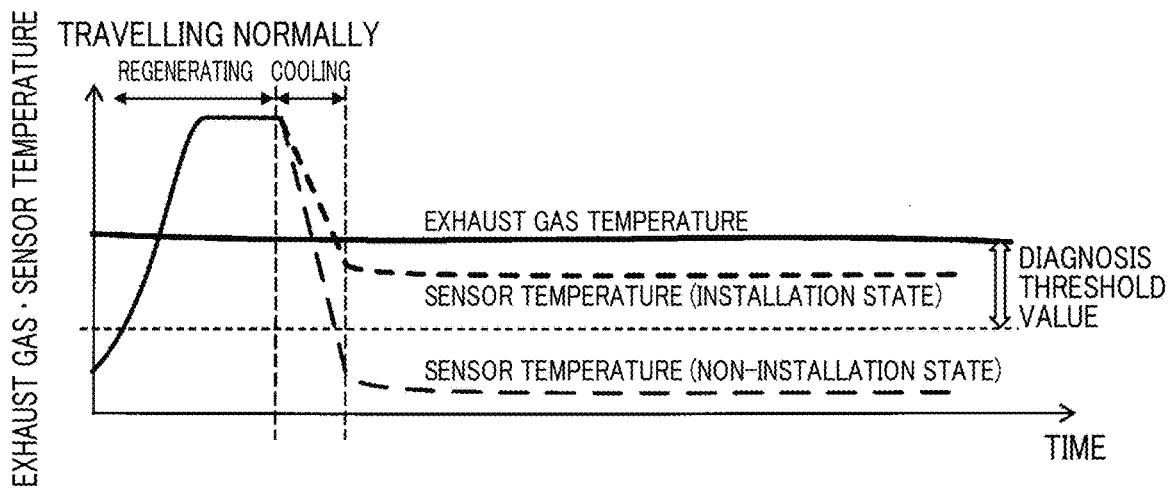
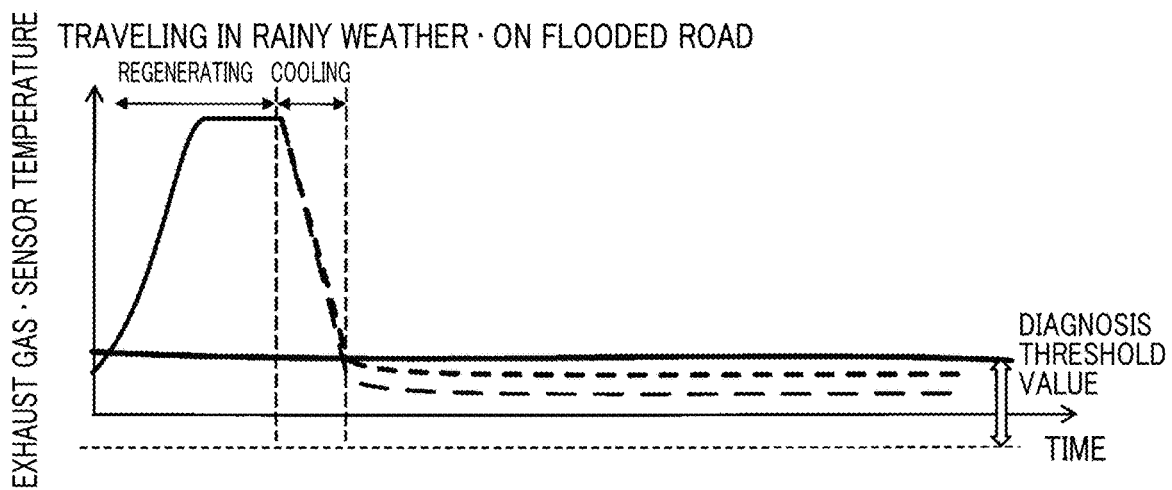
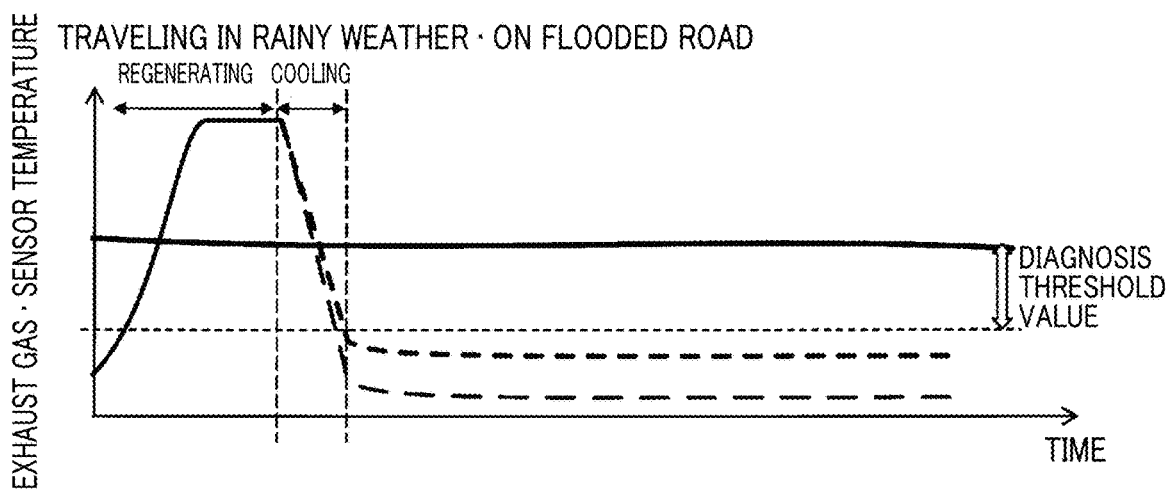

EXHAUST GAS SENSOR

CROSS-REFERENCE TO RELATED APPLICATION

The present application is a U.S. continuation application of International Application No. PCT/JP2020/021260 filed on May 29, 2020 which designated the U.S. and claims the benefit of Japanese Patent Application No. 2019-100209 filed on May 29, 2019, the contents of each of which are incorporated herein by reference.

BACKGROUND

Technical Field

The present disclosure relates to an exhaust gas sensor for detecting components included in an exhaust gas.

Related Art

An exhaust gas sensor is used to detect specific gas components (for example, NOx) or particulate matter (hereinafter, referred to as PM as appropriate) included in an exhaust gas exhausted from an engine of a vehicle or the like.

SUMMARY

As an aspect of the present disclosure, an exhaust gas sensor is provided which detects a specific component included in an exhaust gas of an internal-combustion engine.

The exhaust gas sensor includes:

a sensor body that holds a sensor element including a detector for the specific component, inside a housing attached to an exhaust gas pipe;

an element cover that accommodates the sensor element and a gas ventilation hole through which exhaust gas is introduced to the detector or is discharged from the detector;

a heater that produces heat by energization to heat the sensor element;

a heater control section that controls heating of the sensor element by the heater;

a sensor temperature detection section that detects a temperature of the sensor element; and an installation state diagnosis section that diagnoses an installation state of the sensor body with respect to the exhaust gas pipe based on a sensor temperature detected by the sensor temperature detection section.

The installation state diagnosis section includes a temperature variation amount calculation section that calculates a variation amount of the sensor temperature and a variation amount of an exhaust gas temperature, a temperature variation amount integration section that calculates an integrated value of the variation amounts of the sensor temperature and an integrated value of the variation amounts of the exhaust gas temperature and calculates a ratio of the integrated value of the variation amounts of the sensor temperature to the integrated value of the variation amounts of the exhaust gas temperature, and an abnormality determination section that compares the ratio calculated by the temperature variation amount calculation section with a diagnosis threshold value set as a fixed value to determine presence or absence of an abnormal installation.

The abnormality determination section determines the presence of an abnormal installation if the ratio is less than the diagnosis threshold value.

BRIEF DESCRIPTION OF THE DRAWINGS

In the accompanying drawings:

FIG. 5 is a schematic sectional view for describing operation of the sensor element according the first reference form;

FIG. 6 is a diagram illustrating an example of a relationship between a sensor temperature of the sensor element and a heater resistance according the first reference form;

FIG. 13 is a time diagram for describing a method of installation state diagnosis of the exhaust gas sensor and an influence of a surrounding environment on a diagnosis according to a conventional exhaust gas sensor;

DETAILED DESCRIPTION OF THE PREFERRED EMBODIMENTS

Figure 1:
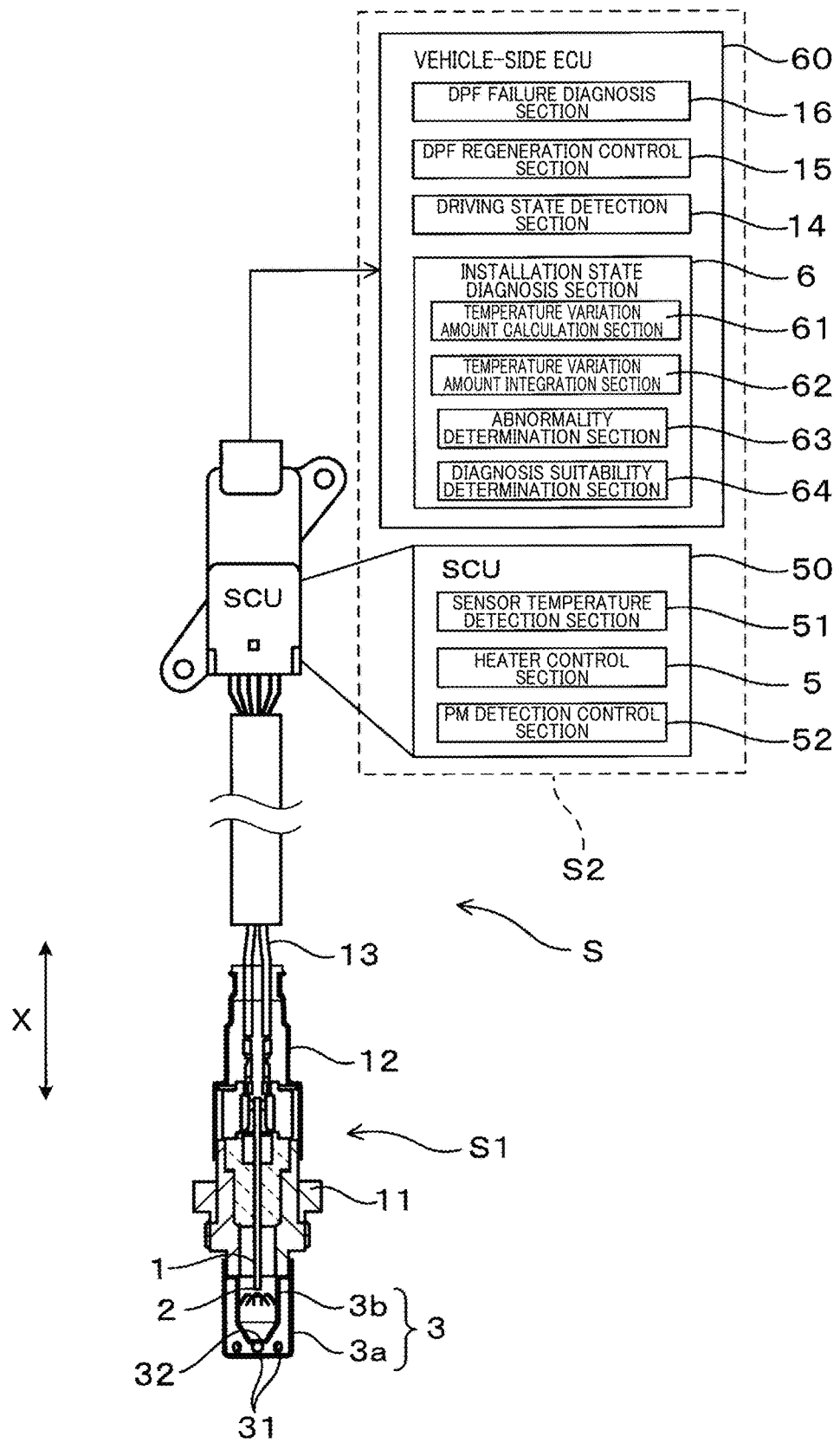
FIG. 1 is a view illustrating an overall configuration of an exhaust gas sensor according to a first reference form.

An exhaust gas sensor is used to detect specific gas components (for example, NOx) or particulate matter (hereinafter, referred to as PM as appropriate) included in an exhaust gas exhausted from an engine of a vehicle or the like. The exhaust gas sensor is typically disposed to an exhaust gas passage in a state in which an end portion of a sensor element supported by a housing is accommodated in an element cover.

Recently, emission controls for vehicle engines have been tightened. Also for exhaust gas sensors, failures thereof are required to be detected. For example, an exhaust gas purification system including a particulate filter collecting particulate matter is provided with a PM sensor to detect particulate matter leaking, for example, when the particulate filter is broken. However, if the PM sensor does not operate normally, the exhaust gas purification system may cause erroneous detection. Hence, it is required to detect presence or absence of an abnormality in the PM sensor to ensure reliability of the system.

A factor in deteriorating the sensor function is a failure in the state of installation of the sensor. For example, if a PM sensor is not correctly installed, and an exhaust gas is not introduced to a detector of a sensor body, proper output cannot be obtained, whereby it may be difficult to detect particulate matter. Hence, US2012/0120981 proposes a system that monitors a sensor unit disposed in an exhaust tube and compares a sensor temperature with an exhaust gas temperature to diagnose the sensor unit as not being in a non-installation state and an incorrect installation state.

Typically, a sensor temperature changes while following an exhaust gas temperature. Hence, in an operating condition in which the exhaust gas temperature is increasing, if the sensor temperature changes to decreasing, any abnormality may have been occurred. Hence, as in US2012/0120981, when a difference between the sensor temperature and the exhaust gas temperature is used, and, for example, the difference has exceeded a predetermined diagnosis threshold value, it is considered that a determination as an abnormal installation has occurred. However, a relationship between the sensor temperature and the exhaust gas temperature changes due to a surrounding environment in which the exhaust gas purification system is used, for example, an external temperature or weather, and the difference between the sensor temperature and the exhaust gas temperature also change. Hence, it is not easy to properly set the diagnosis threshold value, and the environment in which the diagnosis can be performed is limited or an erroneous diagnosis may be caused. Thus, it is difficult to make a determination as a non-installation state with high accuracy.

The present disclosure provides an exhaust gas sensor that can perform a diagnosis of an installation state of a sensor element with high accuracy and has higher reliability.

(First Reference Form)

A reference form illustrating a basic configuration of an embodiment of an exhaust gas sensor will be described with reference to FIG. 1 to FIG. 12.

Figure 2:
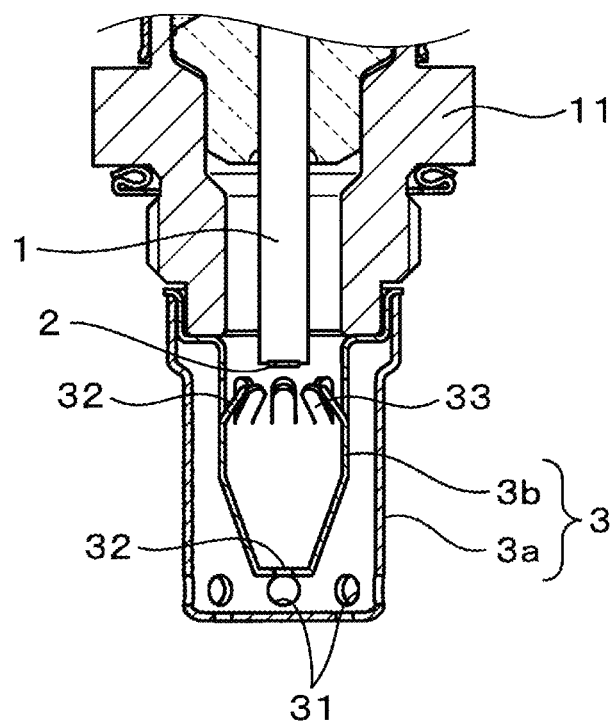
FIG. 2 is an enlarged sectional view of a main part of a sensor main body of the exhaust gas sensor according the first reference form.
Figure 3:
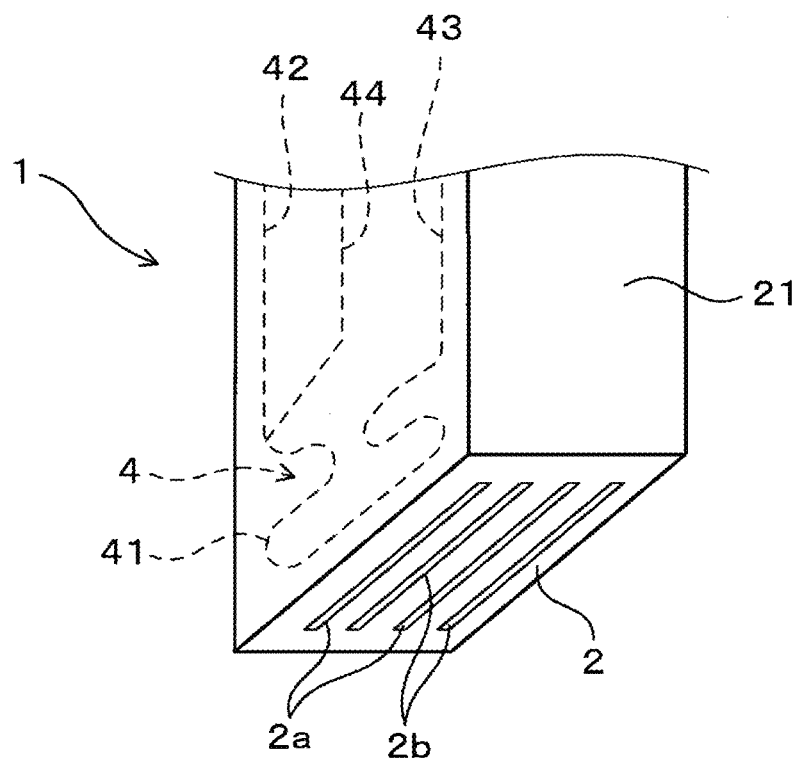
FIG. 3 is an enlarged perspective view of a main part of a sensor element of the exhaust gas sensor according the first reference form.

As shown in FIG. 1 to FIG. 3, an exhaust gas sensor S includes a sensor body S1 and a controller S2. The sensor body S1 has a sensor element 1 including a detector 2, an element cover 3 accommodating the sensor element 1 thereinside, and a heater 4 that produces heat by energization to heat the sensor element 1. The controller S2 has a heater control section 5 that controls heating of the sensor element 1 by the heater 4, a sensor temperature detection section 51 that detects a temperature of the sensor element 1, and an installation state diagnosis section 6 that diagnoses a state of the element cover 3.

Figure 4:
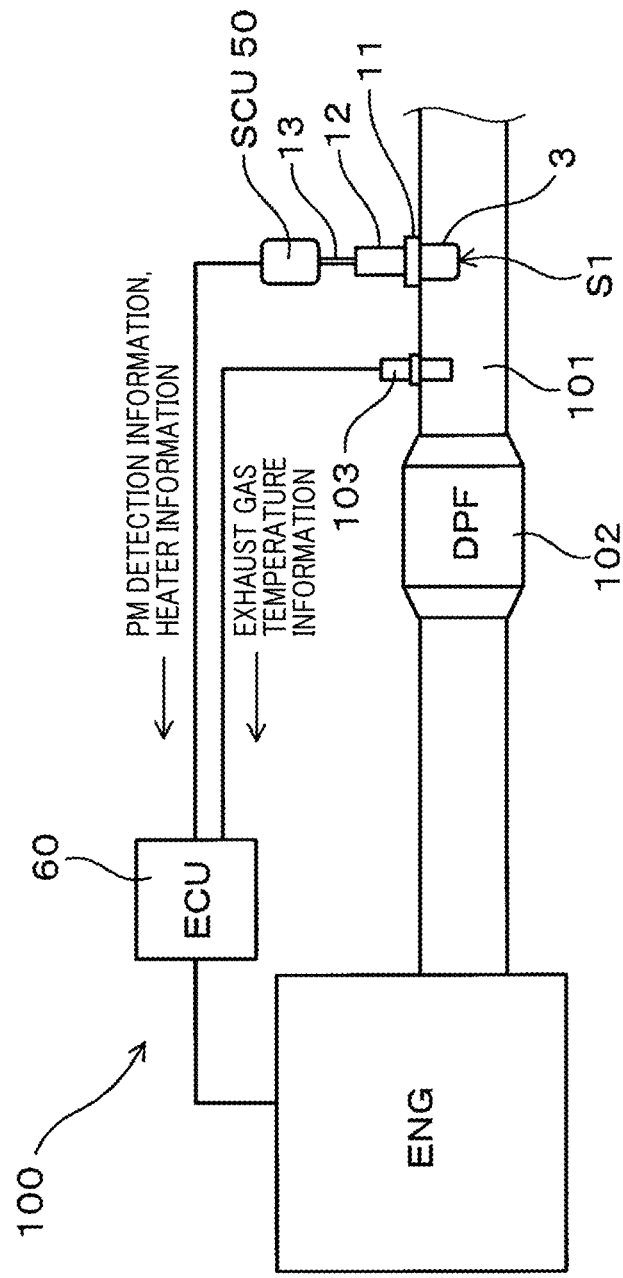
FIG. 4 is a view illustrating an overall configuration of an exhaust gas purification system including the exhaust gas sensor according the first reference form.

As shown in FIG. 4, the exhaust gas sensor S is installed in, for example, an exhaust gas purification device 100 of a vehicle engine ENG, which is an internal-combustion engine. The exhaust gas sensor S is attached to an exhaust gas pipe 101 in a state in which the sensor body S1 is held inside a housing 11. When an exhaust gas is introduced inside the element cover 3 located in the exhaust gas pipe 101, specific components included in the exhaust gas can be detected.

In FIG. 1, the sensor element 1 has an elongated rectangular shape, and extends in an axial direction X of the sensor body S1. Herein, a vertical direction in FIG. 1 is referred to as the axial direction X. The lower end side in the axial direction X is referred to as a tip side of the sensor body S1, and the upper end side in the axial direction X is referred to as a base side of the sensor body S1. The detector 2 is provided to a tip side of the sensor element 1 in the axial direction X and detects specific components included in an exhaust gas. The specific components are, for example, particulate matter (hereinafter, referred to as PM for short as appropriate) included in an exhaust gas exhausted from the vehicle engine ENG, and gas components such as NOx.

The element cover 3 is for protecting the sensor element 1 from poisonous substances, condensed water, and the like in an exhaust gas. The element cover 3 has gas ventilation holes 31, 32 through which an exhaust gas can be introduced in/from space inside the element cover 3. The sensor element 1 includes the heater 4 for heating the sensor element 1 by producing heat by energization (for example, refer to FIG. 3). The heater control section 5 controls heating of the sensor element 1 by the heater 4. The sensor element 1 is connected to a vehicle-side electronic control unit (hereinafter, referred to as ECU) 60 including the installation state diagnosis section 6 via a sensor control unit (hereinafter, referred to as SCU) 50 including the heater control section 5.

The installation state diagnosis section 6 diagnoses a state of installation of the sensor body S1 with respect to the exhaust gas pipe 10 based on a sensor temperature Ts detected by the sensor temperature detection section 51. The installation state diagnosis section 6 includes a temperature variation amount calculation section 61, a temperature variation amount integration section 62, and an abnormality determination section 63 that determines an abnormal installation. The temperature variation amount calculation section 61 calculates a variation amount ΔTs of the sensor temperature Ts (hereinafter, referred to as sensor temperature variation amount for short as appropriate) during a predetermined time period. The temperature variation amount integration section 62 sums the calculated sensor temperature variation amounts ΔTs. The abnormality determination section 63 determines presence or absence of abnormal installation based on the result of a comparison between variation amount integration information and a diagnosis threshold (for example, first diagnosis threshold value TH1).

Preferably, the temperature variation amount calculation section 61 calculates a variation amount ΔTg of an exhaust gas temperature Tg (hereinafter, referred to as exhaust gas temperature variation amount for short as appropriate). The temperature variation amount integration section 62 further calculates an integrated value of the exhaust gas temperature variation amounts ΔTg. The first diagnosis threshold value TH1 can be set based on the integrated value of the exhaust gas temperature variation amounts ΔTg.

Specifically, the temperature variation amount integration section 62 calculates an integrated value of the sensor temperature variation amounts ΔTs as variation amount integration information of the sensor temperature Ts. If the integrated value of the sensor temperature variation amounts ΔTs is the first diagnosis threshold value TH1 or more, the abnormality determination section 63 can determine that no abnormal installation is present.

Preferably, the installation state diagnosis section 6 further includes a diagnosis suitability determination section 64 that determines whether an installation state diagnosis can be performed, based on the integrated value of the exhaust gas temperature variation amount ΔTg. Specifically, if the integrated value of the exhaust gas temperature variation amounts ΔTg is a predetermined specified value T0 or more, the diagnosis suitability determination section 64 can determine that an installation state diagnosis can be performed.

Thus, after the integrated value reaches the specified value T0, an installation state diagnosis can be performed, whereby diagnosis can be performed with higher accuracy.

The diagnosis suitability determination section 64 can also determine whether an installation state diagnosis can be performed, based on, in addition to integration information of the exhaust gas temperature variation amounts ΔTg, for example, at least one of a control state of the heater control section 5, a state of the sensor temperature detection section 51, and an operational state of the vehicle engine ENG.

Next, the configuration of the exhaust gas sensor S will be described in detail.

In FIG. 1, the sensor body S1 of the exhaust gas sensor S accommodates the sensor element 1 inside the cylindrical housing 11, and includes the container-type element cover 3 fixed to the tip side of the cylindrical housing 11 in the axial direction X and a cylindrical air cover 12 fixed to the other end side of the cylindrical housing 11 in the axial direction X. For example, the housing 11 is fitted to the exhaust gas pipe 101 of the exhaust gas purification device 100 shown in FIG. 4. The tip side of the sensor element 1 covered with the element cover 3 protrudes into the exhaust gas pipe 101. The air cover 12 covers the base side of the sensor element 1 located outside the exhaust gas pipe 101. The sensor element 1 and the sensor control unit 50 are electrically connected via a lead wire 13 drawn out from the base side of the air cover 12.

As shown in FIG. 2 and FIG. 3 as an example, the sensor element 1 is, for example, a laminated-type element having a laminated structure, and includes a rectangular insulating base 21 having a flat end surface serving as the detector 2. In the detector 2, a plurality of linear electrodes serving as pairs of sensing electrodes 2a, 2b are disposed, which configure a plurality of pairs of electrodes whose polarities alternate. The detector 2 is formed, for example, by alternately disposing electrode films serving as the sensing electrodes 2a, 26 between a plurality of insulating sheets serving as the insulating base 21 to provide a laminated body, and firing the laminated body so as to be integrated. In this case, an edge of the electrode film, at least part of which is buried in the insulating base 21, is linearly exposed on the end surface of the insulating base 21, which configures the sensing electrodes 2a, 26. The insulating base 21 can be formed by using, for example, insulating ceramic material such as alumina.

Lead parts (not shown) connected to the pair of sensing electrodes 2a, 26 are buried in the insulating base 21. The lead parts are drawn out to the base side of the sensor element 1 and are connected to a PM detection control section 52 of the SCU 50 via the lead wire 13 (for example, refer to FIG. 1). The PM detection control section 52 includes, for example, a voltage application circuit for applying a voltage for detecting PM to parts between the pair of sensing electrodes 2a and 26, and electrostatically collects PM between the pair of sensing electrodes 2a and 26.

The element cover 3 is, for example, a double-container type which is open on the housing 11 side, and includes an outer cover 3a and an inner cover 3b that are coaxially disposed. The outer cover 3a includes a cylindrical body whose diameter is substantially constant and an end surface closing the cylindrical body. The plurality of gas ventilation holes 31 are formed to penetrate a side surface on the end surface side of the outer cover 3a, so that exhaust gas can be introduced or discharged through the exhaust gas pipe 101. The gas ventilation hole 32 is formed to penetrate an end surface side of the inner cover 3b, so that a space in the inner cover 3b and a space in the outer cover 3a communicate with each other.

The plurality of gas ventilation holes 32 are formed to penetrate a side surface on the base side of the inner cover 3b. The gas ventilation holes 32 are provided with guide parts 33 inclined toward the inside of the inner cover 3b. Hence, an exhaust gas introduced inside the outer cover 3a is guided to the base end side along an external side surface of the inner cover 3b, and is introduced inside the inner cover 3b through the gas ventilation holes 32. The tips of the guide parts 33 are arranged so as to face to the detector 2 of the sensor element 1 located on the axis of the inner cover 3b. The exhaust gas introduced inside the inner cover 3b flows to the detector 2. Thereafter, the exhaust gas is discharged through the ventilation holes 32 of the end surface, and meets exhaust gas externally discharged from the outer cover 3a.

The gas ventilation holes 31, 32 on the end surface side of the outer cover 3a and the inner cover 3b have, for example, a circular shape. The gas ventilation holes 32 on the base side of the inner cover 3b have, for example, a long hole shape elongated in the axial direction X, and are integrally formed with the guide parts 33 having an elongated plate shape formed by cutting out part of a side surface of the inner cover 3b.

The shapes of the outer cover 3a, the inner cover 3b, and the gas ventilation holes 31, 32 are not limited to the above, and may be any shapes. The guide parts 33 may not be provided to the gas ventilation holes 32. The number and arrangement of the gas ventilation holes 31, 32 also may be set arbitrarily. Preferably, the gas ventilation holes 31, 32 may be evenly arranged on the whole periphery of the side surface of the outer cover 3a or the inner cover 3b, which provides a configuration having no directional characteristic with respect to the gas flow.

As shown in FIG. 4, the exhaust gas sensor S of the present embodiment is applied to the exhaust gas purification device 100 of the vehicle engine (for example, diesel engine) ENG. The housing 11 of the sensor body S1 is fitted to a wall of the exhaust gas pipe 101 on the downstream side of a diesel particulate filter (hereinafter, referred to as DPF for short) 102. The half of the sensor body S1 on the element cover 3 side is located in the exhaust gas pipe 101. The exhaust gas sensor S is used as a PM sensor to detect particulate matter leaking from the DPF 102 and transmit a detection signal to the SCU 50. A temperature sensor 103 is disposed between the DPF 102 and the sensor body S1 to detect an exhaust gas temperature Tg in the exhaust gas pipe 101 on the downstream side of the DPF 102. The detection signal of the temperature sensor 103 is transmitted to an ECU 60 as exhaust gas temperature information.

The PM detection principle will be described with reference to a schematic view shown in FIG. 5. In the detector 2 of the sensor element 1, a pair of detection electrodes 2a, 2b are arranged on a surface of the insulating base 2 so as to be opposed to each other at a predetermined interval. In an initial state, conduction is not established between the pair of detection electrodes 2a and 2b. During a PM detection period, when a predetermined voltage is applied by the PM detection control section 52, PM is attracted by an electric field generated between the pair of detection electrodes 2a and 2b and is gradually deposited. Hence, when conduction is established between the pair of detection electrodes 2a and 2b, the resistance value between the pair of detection electrodes 2a and 2b changes depending on the collection amount of PM. Thus, the PM detection control section 52 can detect a current between the pair of detection electrodes 2a and 2b.

As shown in FIG. 3, in the insulating base 21, a heater electrode configuring a heat generation part 41 of the heater 4, a pair of lead parts 42, 43 for applying current to the heat generation part 41, and a detection lead part 44 are buried in the vicinity of the end surface to which the sensing electrodes 2a, 2b are provided. The lead parts 42, 43, 44 are drawn out to the base side of the sensor element 1, and are connected to the heater control section 5 of the sensor control unit 50 via the lead wire 13 (for example, refer to FIG. 1).

The heater control section 5 includes, for example, a pulse-width modulation circuit that controls a pulse width of a heater drive signal, and controls an energization amount to the heat generation part 41 by a duty ratio (hereinafter, referred to as heater duty) of a pulse signal. Hence, the heater control section 5 can control the amount of heat generation of the heater 4 to heat the sensor element 1 to a desired temperature so as to correspond to a predetermined control mode of the sensor temperature Ts. For example, before PM is detected by the PM detection control section 52, the detector 2 is heated to a combustion temperature of PM or more, and the collected PM is removed by combustion, thereby returning the detector 2 to an initial state.

The heater control section 5 variably controls a heater duty so that the sensor temperature Ts detected by the sensor temperature detection section 51 corresponds to the control mode. In this case, the sensor temperature detection section 51 can detect the sensor temperature Ts, based on, for example, a resistance value of the heater 4 included in the sensor element 1. Alternatively, a temperature detection means such as a thermocouple or a thermistor may be provided to the sensor element 1 to detect the sensor temperature Ts. The control mode of the sensor temperature Ts by the SCU 50 will be described later.

FIG. 6 illustrates heater resistance characteristics. As shown in an upper figure in FIG. 6, which illustrates a relationship between the sensor temperature Ts (unit: ° C.) and a heater resistance (unit: Ω), as the sensor temperature Ts increases, the heater resistance increases. Hence, for example, providing a heater resistance detection circuit to the sensor temperature detection section 51 can detect a heater resistance from a current flowing to the heat generation part 41 of the heater 4 when a predetermined voltage is applied, and further can detect the sensor temperature Ts by using the relationship illustrated in the upper figure in FIG. 6. A lower figure in FIG. 6 will be described later.

The ECU 60 receives PM sensor information from the SCU 50, exhaust gas temperature information from the temperature sensor 103, and detection information from various sensors, not shown. The PM sensor information includes a control mode of the heater control section 5, heater control information such as a heater duty, sensor temperature information from the sensor temperature detection section 51, and PM detection information from the PM detection control section 52.

The ECU 60 is provided with a driving state detection section 14 that receives the amount of intake air detected by an air flow meter, not shown, and detection signals from an engine speed sensor, an accelerator position sensor, and the like (for example, refer to FIG. 1). The ECU 60 detects a driving state of the engine ENG based on the input information to control the whole vehicle. The driving state of the engine ENG includes exhaust gas information such as an exhaust gas flow rate in the exhaust gas pipe 101, and regeneration information of the DPF 102 disposed in the exhaust gas pipe 101. The exhaust gas flow rate may be a detection value or an estimated value estimated from a driving state of the engine ENG or the like.

The ECU 60 includes a DPF regeneration control section 15 that performs regeneration control of the DPF 102 and a DPF failure diagnosis section 16 that performs a failure diagnosis of the DPF 102. For example, the DPF regeneration control section 15 determines necessity of performing regeneration of the DPF 102 based on a driving state of the vehicle detected by the driving state detection section 14. For example, the DPF failure diagnosis section 16 determines presence or absence of a failure such as a crack of the DPF 102 based on the PM detection information from the PM detection control section 52.

The engine ENG is not limited to a diesel engine and may be a gasoline engine. In this case, instead of the DPF 102, a gasoline particulate filter (that is, GPF) is disposed.

Next, the installation state diagnosis section 6 of the exhaust gas sensor S will be described in detail.

The PM detection information of the PM detection control section 52 is mainly used for a failure diagnosis of the DPF 102 by the DPF failure diagnosis section 16 of the ECU 60 described above. In this case, to reliably detect a failure of the DPF 102, PM detection by the exhaust gas sensor S is needed to be performed normally. To achieve this, it is important that the sensor body S1 including the sensor element 1 is appropriately installed at a predetermined position.

For example, when the engine ENG starts in a state where the sensor body S1 is intentionally or erroneously removed from the exhaust gas pipe 101, exhaust gas does not reach the sensor element 1. In such a case, even if the DPF 102 has failed, no PM detection signal is output from the sensor element 1. Hence, failure determination and notification to a driver are not performed, whereby particulate matter may be externally exhausted.

Similarly, also in a case where sufficient exhaust gas is not introduced inside the element cover 3 because the sensor body 51 is not appropriately fitted to the exhaust gas pipe 101, or the sensor body 51 is not in a proper attitude, proper output cannot be obtained from the sensor element 1, whereby it may be difficult to detect PM.

Accordingly, the exhaust gas sensor S is provided with the installation state diagnosis section 6 summarized in FIG. 7 and performs a diagnosis of an installation state of the sensor element 1 (hereinafter, referred to as installation state diagnosis as appropriate), whereby abnormal installation due to detachment of the sensor body S1 including the sensor element 1 or the like can be detected.

Figure 7:
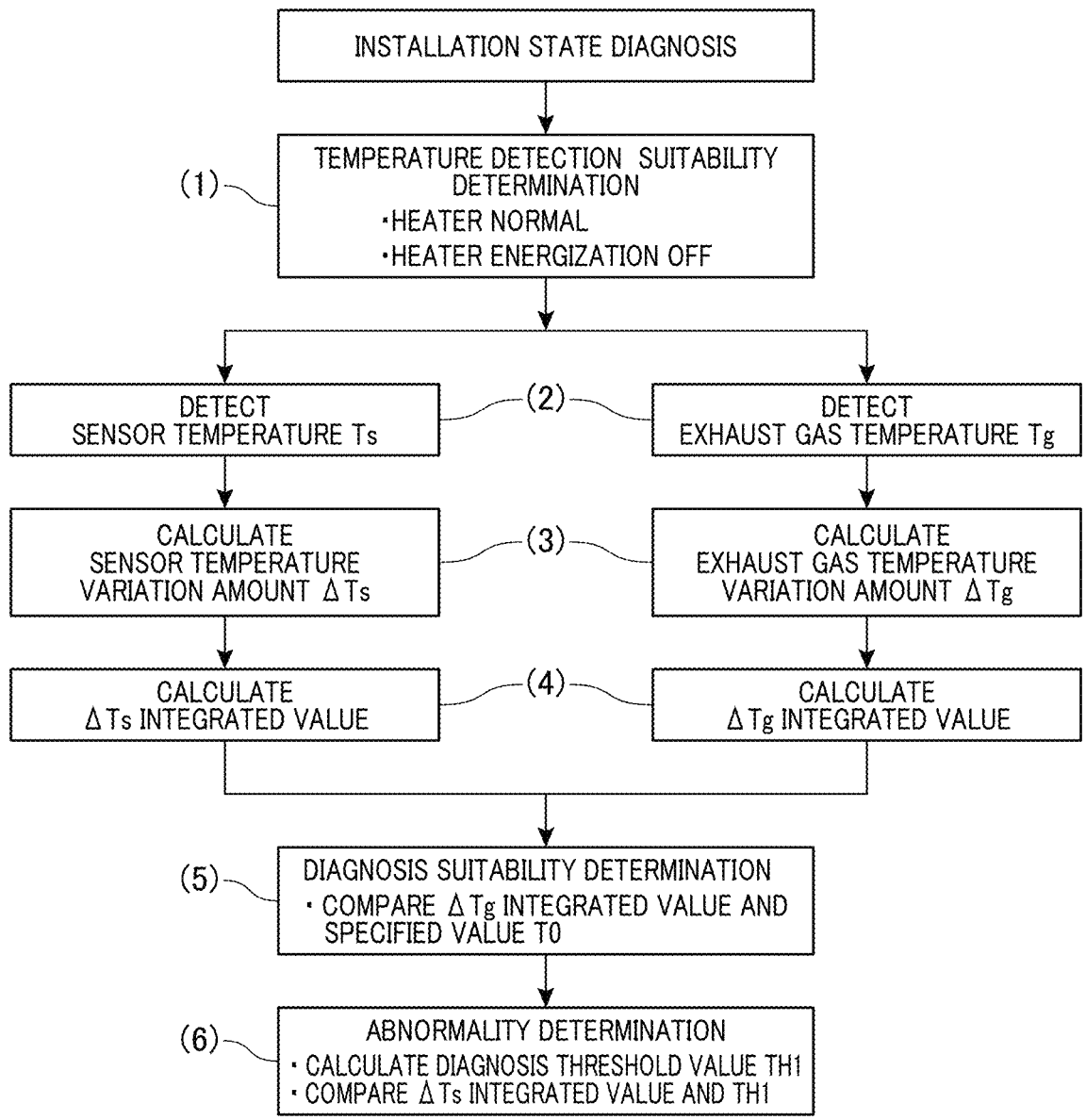
FIG. 7 is a diagram illustrating a schematic process of an installation state diagnosis section of the exhaust gas sensor according the first reference form.

In steps (1) to (6) of the installation state diagnosis illustrated in FIG. 7, step (3) corresponds to the temperature variation amount calculation section 61, step (4) corresponds to the temperature variation amount integration section 62, and step (6) corresponds to the abnormality determination section 63. Steps (1) and (5) correspond to the diagnosis suitability determination section 64. In step (2), the sensor temperature detection section 51 is used.

For the installation state diagnosis, the variation amount integration information of the sensor temperature Ts based on detection results of the sensor temperature detection section 51 in step (2) can be used. In the present embodiment, as the variation amount integration information of sensor temperature Ts, an integrated value of the sensor temperature variation amounts ΔTs (hereinafter, referred to as ΔTs integrated value as appropriate) is used and is compared with the predetermined first diagnosis threshold value TH1.

Preferably, before the calculation of the ΔTs integrated value in steps (2) to (4), as illustrated in step (1), it is desirable to determine suitability of an installation state diagnosis based on the state of the sensor temperature detection section 51 and the control state of the heater control section 5. The state of the sensor temperature detection section 51 can be determined based on suitability of performing temperature detection by the sensor temperature detection section 51. The control state of the heater control section 5 can be determined based on the control mode of the sensor element 1 by the SCU 50.

Specifically, when the detection of the sensor temperature Ts can be performed normally by using a resistance value of the heater 4, and the control mode of the sensor element 1 is a mode in which energization to the heater 4 is off (for example, collection mode collecting particulate matter), temperature detection by the sensor temperature detection section 51 can be performed, and it can be determined that an installation state diagnosis can be performed because the state is suited for the installation state diagnosis.

In contrast, when normal temperature detection cannot be performed due to deterioration of the heater 4 or the like, or the control mode of the sensor element 1 is a mode that may affect the temperature detection by the sensor temperature detection section 51, it is determined that an installation state diagnosis cannot be performed because the state is not suited for the installation state diagnosis. In this case, it is determined that the temperature detection in step (2) cannot be performed, and the later installation state diagnosis is not performed.

The suitability of performing temperature detection is determined based on a heater resistance used for detecting the sensor temperature Ts as shown in a lower figure of FIG. 6. For example, if the heater resistance changes due to deterioration of the heater or the like, accuracy in detecting the sensor temperature Ts by using the heater resistance lowers. Hence, a normal range of the heater resistance is previously set so that resistance threshold values Rth1 and Rth2 are upper and lower limits. If the detected heater resistance is in the normal range (that is, Rth1 heater resistance Rth2), it can be determined that the heater 4 is in a normal state.

Figure 8:
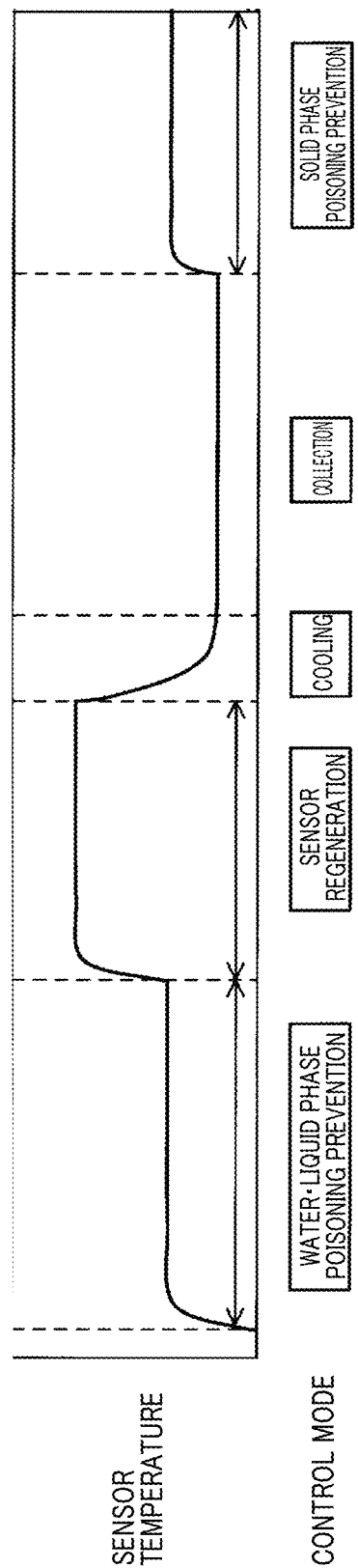
FIG. 8 is a diagram illustrating a relationship between a control mode of the sensor element of the exhaust gas sensor and a sensor temperature according the first reference form.

As illustrated in FIG. 8, when the engine ENG starts, the control mode of the sensor element 1 by the SCU 50 changes in order of a water/liquid phase poisoning prevention mode, a sensor regeneration mode, a cooling mode, a collection mode, and a solid phase poisoning prevention mode. For example, in the water/liquid phase poisoning prevention mode, the temperature at which drops of water and the like adhering to the sensor element 1 can evaporate is held. Then, in the sensor regeneration mode, the temperature is increased to a temperature at which particulate matter can burn and is held. Next, in the cooling mode, energization to the heater 4 is stopped, and the sensor element 1 is cooled to a temperature equivalent to the exhaust gas temperature Tg in the exhaust gas pipe 101. Then, the control mode proceeds to the collection mode. Thereafter, in the solid phase poisoning prevention mode, the temperature at which solid phase poisoning material adhering to the sensor element 1 can be removed can be held.

As described above, suitability of performing temperature detection by the sensor temperature detection section 51 is determined from the state or the control stater of the heater 4 used by the sensor temperature detection section 51. Hence the installation state can be diagnosed with higher accuracy.

If it is determined that the installation state diagnosis can be performed in step (1), in steps (2) to (4), the installation state diagnosis section 6 sequentially performs detection of the sensor temperature Ts by the sensor temperature detection section 51, calculation of the sensor temperature variation amount ΔTs, and calculation of the ΔTs integrated value.

The sensor temperature variation amount ΔTs may be a variation amount of the sensor temperature Ts per unit time, for example, a difference value (absolute value) between a previous value and a current value of the sensor temperature Ts detected at a constant period. Alternatively, the sensor temperature variation amount ΔTs may be a variation amount of the sensor temperature Ts detected at every unit time, for example, a difference value (absolute value) between the sensor temperature Ts detected at a constant period and a reference temperature.

In addition to the sensor temperature Ts, also regarding the exhaust gas temperature Tg, an integrated value of the exhaust gas temperature variation amounts ΔTg (hereinafter, referred to as ΔTg integrated value) is desirably calculated as variation amount integration information. In this case, according to a procedure similar to that for the sensor temperature Ts, detection of the exhaust gas temperature Tg using the temperature sensor 103, calculation of the exhaust gas temperature variation amount ΔTg, and calculation of the ΔTg integrated value can be sequentially performed. The exhaust gas temperature variation amount ΔTg can be calculated as in the sensor temperature variation amount ΔTs.

Before the determination of abnormal installation, in step (5), the installation state diagnosis section 6 desirably determines suitability of an installation state diagnosis based on the calculated ΔTg integrated value. Whether the integrated amount of the variation in the exhaust gas temperature Tg is sufficient for the diagnosis can be determined by comparing the ΔTg integrated value with the preset specified value T0.

If the ΔTg integrated value has reached the specified value T0, in step (6), the installation state diagnosis section 6 determines presence or absence of abnormal installation based on the calculated ΔTg integrated value. For example, the first diagnosis threshold value TH1, which is a variable value, is calculated based on the ΔTg integrated value, and is compared with the ΔTs integrated value. If the ΔTs integrated value has reached the first diagnosis threshold value TH1, the installation state diagnosis section 6 determines that the installation is normal. If the ΔTs integrated value has not reached the first diagnosis threshold value TH1, the installation state diagnosis section 6 determines that the installation is abnormal.

An example of an installation state diagnosis process performed by the installation state diagnosis section 6 will be described with reference to a flowchart shown in FIG. 9. The present process is repeatedly performed, for example, at a constant period.

Figure 9:
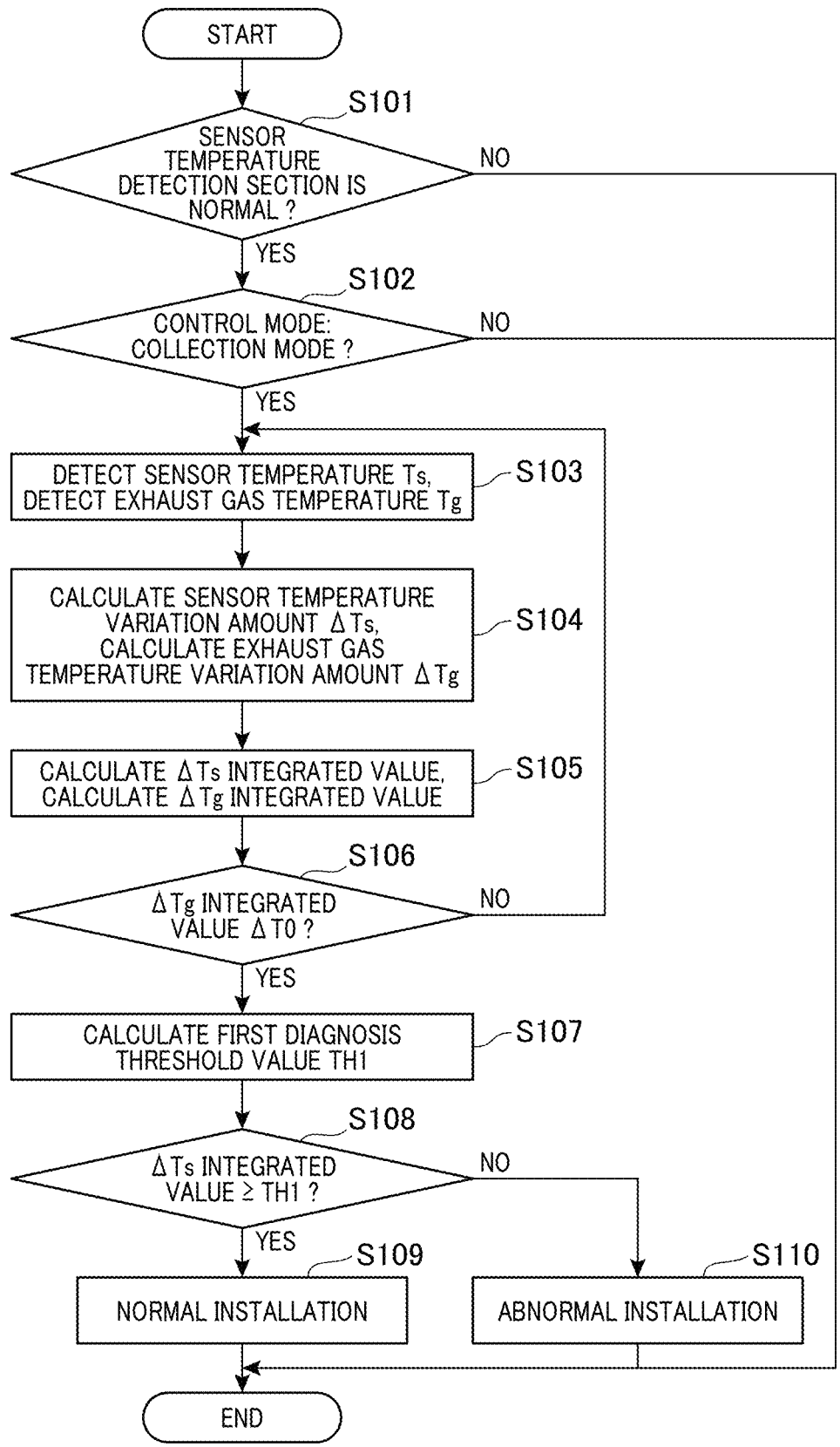
FIG. 9 is a flowchart of an installation state diagnosis process performed by the installation state diagnosis section of the exhaust gas sensor according the first reference form.

Steps S101 to S102 in FIG. 9 correspond to step (1) in FIG. 7. Steps S103 to S105 in FIG. 9 respectively correspond to steps (2) to (4) in FIG. 7. Step S106 in FIG. 9 corresponds to step (5) in FIG. 7. Steps S107 to S108 in FIG. 9 correspond to step (6) in FIG. 7.

In FIG. 9, when the installation state diagnosis process starts, first in step S101, the installation state diagnosis section 6 determines whether the sensor temperature detection section 51 can operate normally. Specifically, the installation state diagnosis section 6 detects a heater resistance from a current flowing when the heater control section 5 has applied a predetermined voltage to the heater 4, and determines whether the detected heater resistance is in a normal range based on the relationship illustrated in the upper figure of FIG. 6 (that is, whether Rth1 heater resistance Rth2).

The heater 4 is formed of conductive material including noble metal. When continuous or intermittent heating is repeated according to the operation of the sensor element 1, the heater resistance changes due to coagulation of noble metal material or the like. If the change becomes great, the heater 4 does not function normally, thereby lowering accuracy in the installation state diagnosis. Hence, for example, a heater resistance in an initial state is previously measured, and the resistance threshold value Rth1 based on an initial resistance is used as a lower limit of the normal range. With respect to the resistance threshold value Rth1, considering the amount of change in the heater resistance due to age deterioration or the like, the resistance threshold value Rth2 may be set as an upper limit of the normal range.

If an affirmative determination is made in step S101, the installation state diagnosis section 6 determines that the sensor temperature detection section 51 for detecting the sensor temperature Ts can operate normally, and the process proceeds to step S102. If a negative determination is made in step S101, the installation state diagnosis section 6 determines that the sensor temperature detection section 51 does not operate normally, and the present process is halted, so that no installation state diagnosis is performed.

In step S102, the installation state diagnosis section 6 determines whether the control mode of the sensor temperature Ts by the SCU 50 is a collection mode. If an affirmative determination is made in step S102, the installation state diagnosis section 6 determines that energization to the heater 4 is off and there is no influence of heating by the heater 4, which is suited to the installation state diagnosis. Then, the process proceeds to step S103. If a negative determination is made in step S102, the installation state diagnosis section 6 determines that the control mode is not a collection mode, which is not suited to the installation state diagnosis using the sensor temperature detection section 51. Then, the present process ends, and the installation state diagnosis is not performed.

As illustrated in FIG. 8, when the engine ENG starts, the control mode of the sensor element 1 by the SCU 50 changes from the water/liquid phase poisoning prevention mode to the sensor regeneration mode, in which the heater 4 is energized by the heater control section 5 to control the temperature to a predetermined temperature. Thereafter, in the cooling mode, the heater 4 is turned off, and the control mode proceeds to the collection mode. In the collection mode after the cooling, the temperature of the sensor element 1 has been lowered to substantially the exhaust gas temperature Tg, and the sensor temperature Ts also changes in accordance with the change in the exhaust gas temperature Tg.

Thus, if the control mode of the sensor element 1 by the SCU 50 is the collection mode, the heater 4 is in an off state, and the sensor temperature Ts is equivalent to the exhaust gas temperature Tg, whereby abnormality determination can be performed by the installation state diagnosis section 6.

As described above, in steps S101 and S102, whether an installation state diagnosis can be performed is previously determined based on a heater state, whereby reliability of the installation state diagnosis can be increased.

In step S103, the installation state diagnosis section 6 acquires the sensor temperature Ts detected by the sensor temperature detection section 51 and the exhaust gas temperature Tg detected by the temperature sensor 103.

Next, the process proceeds to step S104, in which the installation state diagnosis section 6 calculates the sensor temperature variation amount $\Delta Ts$ and the exhaust gas temperature variation amount $\Delta Tg$. For example, as shown in the following expressions, the absolute values of difference values between a sensor temperature Ts detected last time and a sensor temperature Ts detected at the current time and between an exhaust gas temperature Tg detected last time and an exhaust gas temperature Tg detected at the current time are calculated as the sensor temperature variation amount $\Delta Ts$ and the exhaust gas temperature variation amount $\Delta Tg$.

$\Delta Ts$=the absolute value of [Ts at last time−Ts at current time]

$\Delta Tg$=the absolute value of [Tg at last time−Tg at current time]

Next, the process proceeds to step S105, in which the installation state diagnosis section 6 calculates the $\Delta Ts$ integrated value and the $\Delta Tg$ integrated value. For example, as shown in the following expressions, the sensor temperature variation amount $\Delta Ts$ and the exhaust gas temperature variation amount $\Delta Tg$ calculated at current time are respectively added to the $\Delta Ts$ integrated value and the $\Delta Tg$ integrated value at the last time to obtain a $\Delta Ts$ integrated value and a $\Delta Tg$ integrated value at the current time. That is, the integrated value calculated at current time is a value obtained by summing all the temperature variation amounts (absolute values) obtained by the current time.

$\Delta Ts$ integrated value=$\Delta Ts$+[$\Delta Ts$ integrated value at last time]

$\Delta Tg$ integrated value=$\Delta Tg$+[$\Delta Tg$ integrated value at last time]

Next, the process proceeds to step S106 and later steps to perform the installation state diagnosis.

Figure 10:
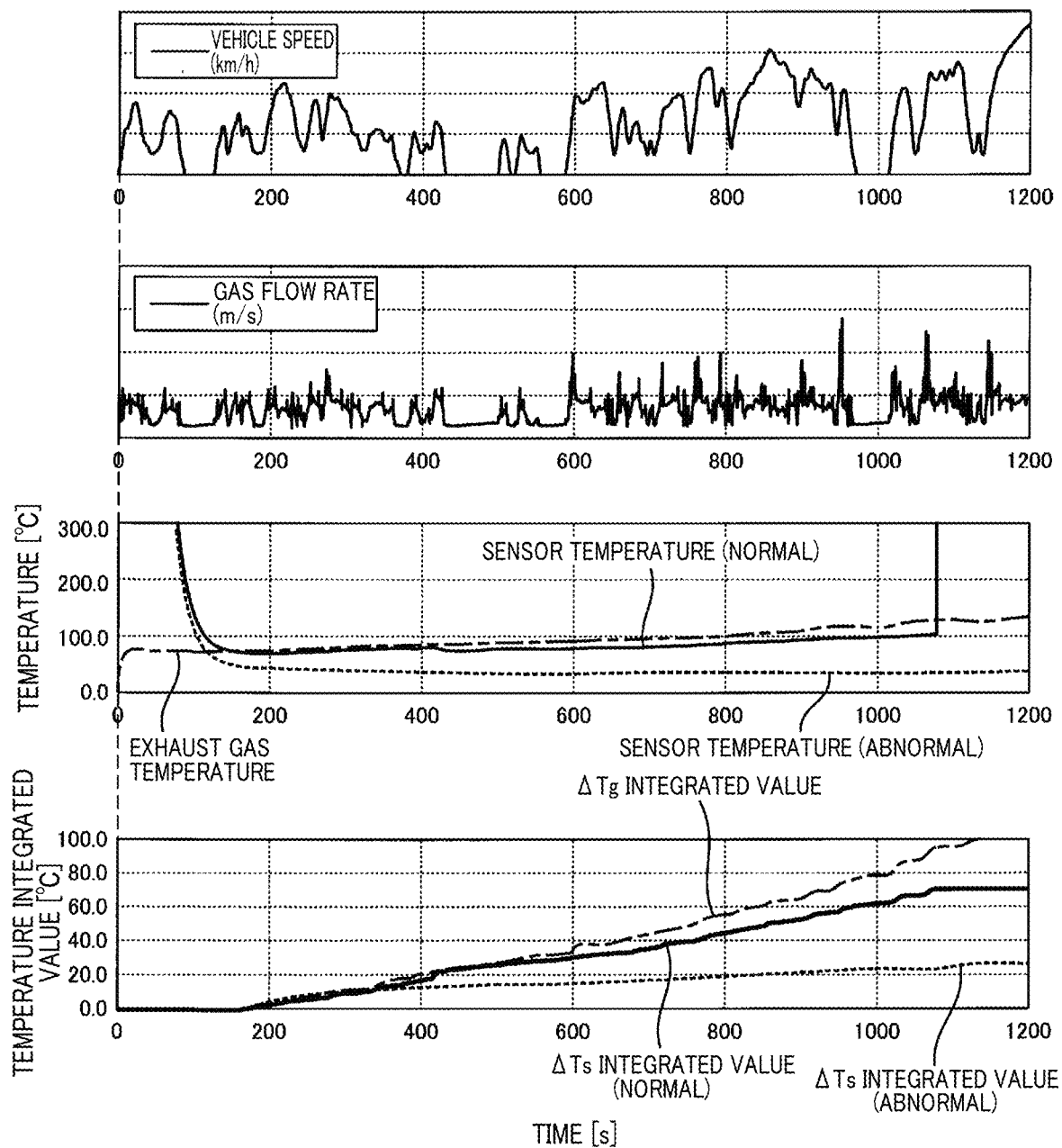
FIG. 10 is a time diagram illustrating a change of heating control by a heater section of the exhaust gas sensor and a temperature of the sensor element according the first reference form.

As shown in FIG. 10, in an operational state in which an engine speed and an exhaust gas flow change, a relationship between the exhaust gas temperature Tg and the sensor temperature Ts changes depending on whether the installation state is normal. That is, if the installation state is normal, the sensor temperature Ts decreases to the exhaust gas temperature Tg due to regeneration and cooling of the sensor element 1. Thereafter, the sensor temperature Ts also changes so as to follow the change in the exhaust gas temperature Tg. In contrast, if the sensor body S1 is in a non-installation state, the sensor temperature Ts decreases to approximately an external temperature lower than the exhaust gas temperature Tg, and thereafter, the change in the sensor temperature Ts is small.

Hence, compared with the change in the exhaust gas temperature Tg, the change in the sensor temperature Ts in a normal installation state is greater than that in an abnormal installation state. The $\Delta Ts$ integrated value in a normal installation state is more than the $\Delta Ts$ integrated value in an abnormal installation state. While the $\Delta Ts$ integrated value in a normal installation state changes so as to be along the $\Delta Tg$ integrated value, the $\Delta Ts$ integrated value in an abnormal installation state deviates from the $\Delta Tg$ integrated value with time, and the difference between the $\Delta Tg$ integrated values in a normal installation state and an abnormal installation state becomes larger with time.

FIG. 10 illustrates a relationship between a state of changes in the exhaust gas temperature Tg and the sensor temperature Ts in a WLTC (worldwide harmonized Light duty driving test cycle) mode, which is an automotive exhaust gas test mode, and integrated values thereof. If performing temperature detection becomes possible, summing the temperature changes starts. The ΔTg integrated value and the ΔTs integrated value become the overall length of the locus of a characteristic line indicating a temperature change in the sensor temperature Ts after the summing starts.

If the installation state of the sensor element 1 is normal, an exhaust gas that has passed through the gas ventilation holes 31, 32 easily comes into contact with a surface of the sensor element 1. Hence, the sensor element 1 is easily affected by the variation in the exhaust gas temperature Tg, and the variation amount of the sensor temperature Ts becomes large. Furthermore, the sensor temperature Ts varies also due to variation in the exhaust gas flow rate. For example, if the exhaust gas flow rate is high, the change in the exhaust gas temperature Tg is easily transferred to the sensor element 1. Hence, compared with a case in which the exhaust gas flow rate is low, the variation amount of the sensor temperature Ts becomes large.

In contrast, if the installation state of the sensor element 1 is abnormal, that is, the sensor element 1 is in a non-installation state or in a state in which the sensor element 1 is almost not exposed to exhaust gas, the sensor element 1 is not easily affected by the exhaust gas temperature Tg, variation in the exhaust gas temperature Tg, variation in an exhaust gas rate, and the like. Hence, the sensor temperature Ts in an abnormal installation state approaches an external temperature lower than the exhaust gas temperature Tg, and the variation amount of the sensor temperature Ts also becomes smaller than that in the normal installation state. Hence, by using the relationship, presence or absence of an abnormality in the installation state of the sensor element 1 can be determined from the ΔTs integrated value obtained by summing the sensor temperature variation amounts ΔTs.

Figure 11:
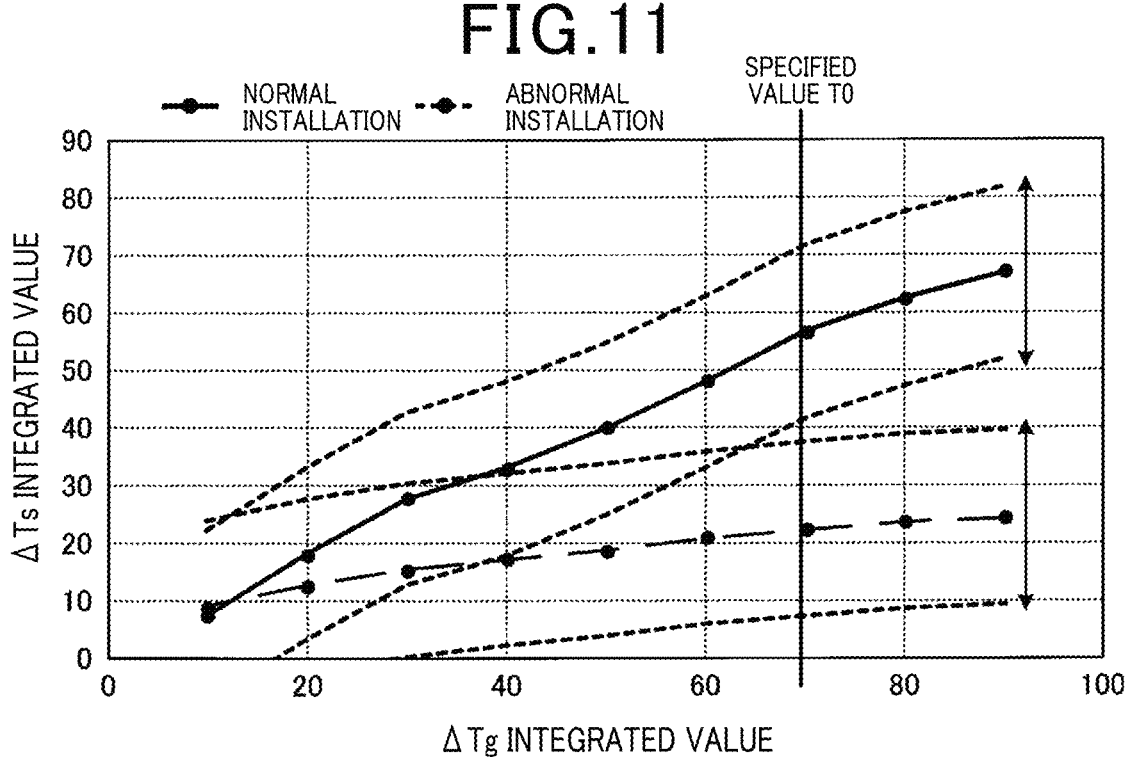
FIG. 11 is a diagram illustrating a relationship between a ΔTg integrated value and a ΔTs integrated value used in the installation state diagnosis section of the exhaust gas sensor, with comparison between a normal installed part and an abnormal installed part according the first reference form.

As shown in FIG. 11, in a graph in which the horizontal axis indicates the ΔTg integrated value and the vertical axis indicates the ΔTs integrated value, in a range in which the ΔTg integrated value is relatively small, the difference between the ΔTg integrated values in a normal installation state and in an abnormal installation state is not large. Considering variations indicated by dotted lines in FIG. 11, it is not easy to distinguish between the ΔTs integrated values in a normal installation state and in an abnormal installation state. However, the difference between the ΔTs integrated values in a normal installation state and in an abnormal installation state gradually increases. When the difference exceeds a constant ΔTg integrated value (that is, the specified value T0 shown in FIG. 11: for example, 70° C.), the ΔTs integrated values in a normal installation state and in an abnormal installation state can be distinguished from each other. The specified value T0 can be appropriately set so that the ΔTs integrated value in a normal installation state (lower limit including a variation) and the ΔTs integrated value in an abnormal installation state (upper limit including a variation) can be distinguished from each other in a range in which they do not overlap with each other.

Figure 12:
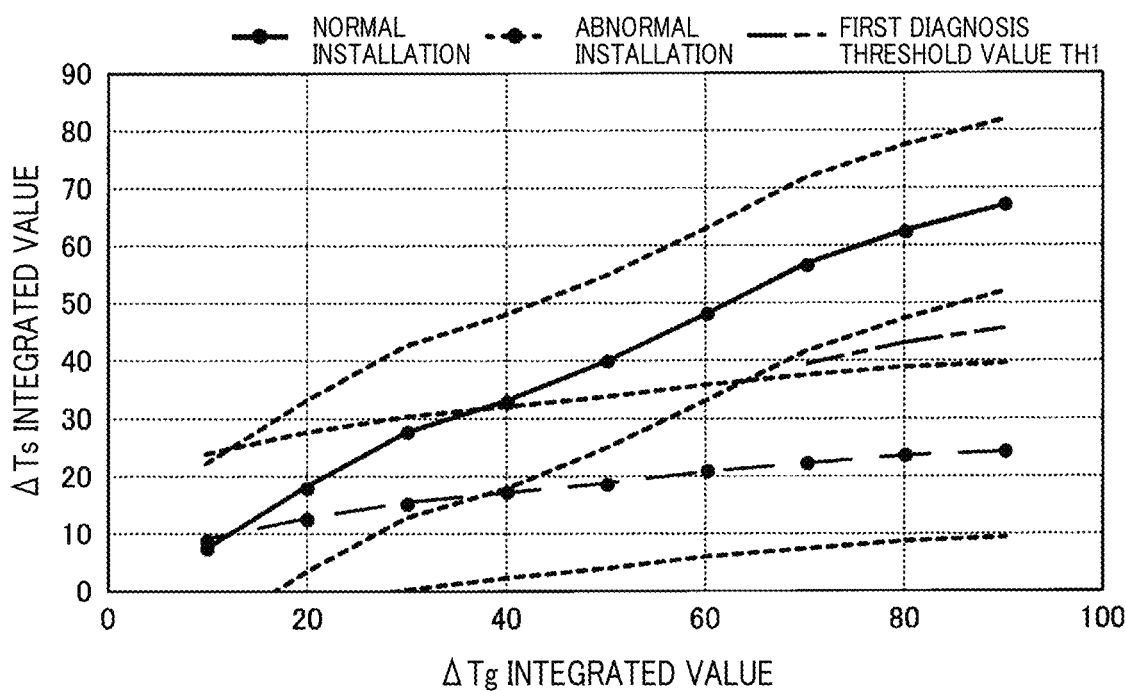
FIG. 12 is a diagram illustrating a relationship between a ΔTg integrated value and a ΔTs integrated value, and a diagnosis threshold value, used in the installation state diagnosis section of the exhaust gas sensor according the first reference form.

As shown in FIG. 12, in a range in which the ΔTg integrated value is the specified value T0 or more, the first diagnosis threshold value TH1 for distinguishing between a normal installation state and an abnormal installation state can be set depending on the magnitude of the ΔTg integrated value. The first diagnosis threshold value TH1 may be, for example, a median value between the ΔTs integrated value in a normal installation state (lower limit including a variation) and the ΔTs integrated value in an abnormal installation state (upper limit including a variation), and is set as the following table 1.

TABLE 1

| ΔTg integrated value [° C.] | 70 | 80 | 90 |
|---|---|---|---|
| TH1 [° C.] | 39.4 | 43.0 | 45.6 |

In step S106, the installation state diagnosis section 6 determines whether the ΔTg integrated value calculated in step S105 has become the specified value T0 or more by using the relationship illustrated in FIG. 11 (that is, whether ΔTg integrated value T0). If an affirmative determination is made in step S106, the installation state diagnosis section 6 determines that the integrated value of the exhaust gas temperature variation amounts ΔTg has reached the specified value T0 by which an installation state diagnosis can be performed. Then, the process proceeds to step S107. If a negative determination is made in step S106, the process returns to step S103, and then step S103 and later steps are repeated.

In step S107, the installation state diagnosis section 6 calculates the first diagnosis threshold value TH1 from the ΔTg integrated value calculated in step S105 by using the relationship illustrated in FIG. 12. For example, the installation state diagnosis section 6 previously stores a threshold value map or an arithmetic expression based on the relationship in the above table 1. Hence, the first diagnosis threshold value TH1 for the installation state diagnosis can be appropriately calculated so as to correspond to the ΔTg integrated value at the time of the diagnosis of the installation state.

Next, the process proceeds to step S108, in which the installation state diagnosis section 6 determines whether the ΔTg integrated value calculated in step S105 has become equal to or more than the first diagnosis threshold value TH1 calculated in S106 (that is, whether ΔTs integrated value TH1). If an affirmative determination is made in step S108, the process proceeds to step S109, in which the installation state diagnosis section 6 determines that the installation is normal. If a negative determination is made in step S108, the process proceeds to step S110, in which the installation state diagnosis section 6 determines that the installation is abnormal. Thereafter, the present process ends.

For example, as shown in the above table 1, if the ΔTg integrated value is 80° C., the first diagnosis threshold value TH1 is 43° C. If the element cover 3 is in a normal state, the ΔTg integrated value including a variation is about 47 to 77° C., which is higher than the first diagnosis threshold value TH1. Thus, a determination as normal is made. In contrast, if the element cover 3 is not in a normal state, the ΔTg integrated value including a variation is about 24 to 39° C., which is lower than the first diagnosis threshold value TH1. Thus, a determination as abnormal is made.

As described above, the installation state diagnosis section 6 of the present embodiment includes the variation amount calculation section 61 and the variation amount integration section 62 that sum the variation amounts of the sensor temperature Ts detected by the sensor temperature detection section 51 and sum the variation amounts of the sensor temperature Tg. The abnormality determination section 63 compares the first diagnosis threshold value TH1 depending on the ΔTg integrated value with the ΔTs integrated value, whereby whether the installation state of the sensor element 1 is normal or abnormal can be reliably determined. Before the determination of presence or absence of abnormal installation, the diagnosis suitability determination section 64 determines that the state of the heater 4 is suited to detect a temperature because the integrated value of the exhaust gas temperature variation amounts ΔTg has becomes the predetermined specified value T0 or more. Thus, the installation state diagnosis can be performed with higher accuracy and higher reliability.

As shown in FIG. 13, in comparison between the sensor temperature Ts and the exhaust gas temperature Tg, when a surrounding environment such as an external temperature or weather changes, the difference between the temperatures also changes. For example, the upper figure in FIG. 13 illustrates a temperature change in the regeneration mode and the later modes after normal traveling. In a normal installation state, the sensor temperature Ts after regeneration and cooling is stabilized at a temperature slightly lower than the sensor temperature Tg. In contrast, in a non-installation state, the sensor temperature Ts decreases to a lower temperature, whereby the difference between the exhaust gas temperature Tg and the sensor temperature Ts in a normal state becomes large. As described above, conventionally, a diagnosis threshold value is set based on the difference to perform an installation state diagnosis using the difference between the sensor temperature Ts and the exhaust gas temperature Tg.

However, as in traveling in rainy weather or on a flooded road illustrated in the middle figure in FIG. 13, if the exhaust gas pipe 101 is in an environment in which the exhaust gas pipe 101 is easily cooled, the exhaust gas temperature Tg of the exhaust gas flowing in the exhaust gas pipe 101 easily decreases compared with that in a normal traveling state. Hence, not only the sensor temperature Ts in a normal installation state following the exhaust gas temperature Tg but also the difference between the sensor temperature Ts and the exhaust gas temperature Tg in an abnormal installation state are also within the range of a possible diagnosis threshold value, which may make an erroneous determination as a normal state.

In traveling in rainy weather or on a flooded road illustrated in the lower figure in FIG. 13, for example, in an environment in which the flow rate of exhaust gas is high and the exhaust gas temperature Tg does not easily decrease, the exhaust gas temperature Tg is similar to that in a normal state. However, when part of the sensor body S1 externally exposed from the exhaust gas pipe 101 is cooled, only the sensor temperature Ts may decrease. In this case, even in a normal installation state, the difference between the exhaust gas temperature Tg and the sensor temperature Ts becomes large. Hence, the sensor element 1 in a normal state may be erroneously determined to be in a non-installation state.

As described above, according the method using the difference between the sensor temperature Ts and the exhaust gas temperature Tg, it is difficult to perform an installation state diagnosis with high accuracy. To avoid an erroneous determination, for example, the environment in which the diagnosis can be performed may be limited. In contrast, according to the installation state diagnosis section 6 of the present embodiment, the diagnosis can be performed with high accuracy regardless of the surrounding environment.

Second Embodiment

Figure 14:
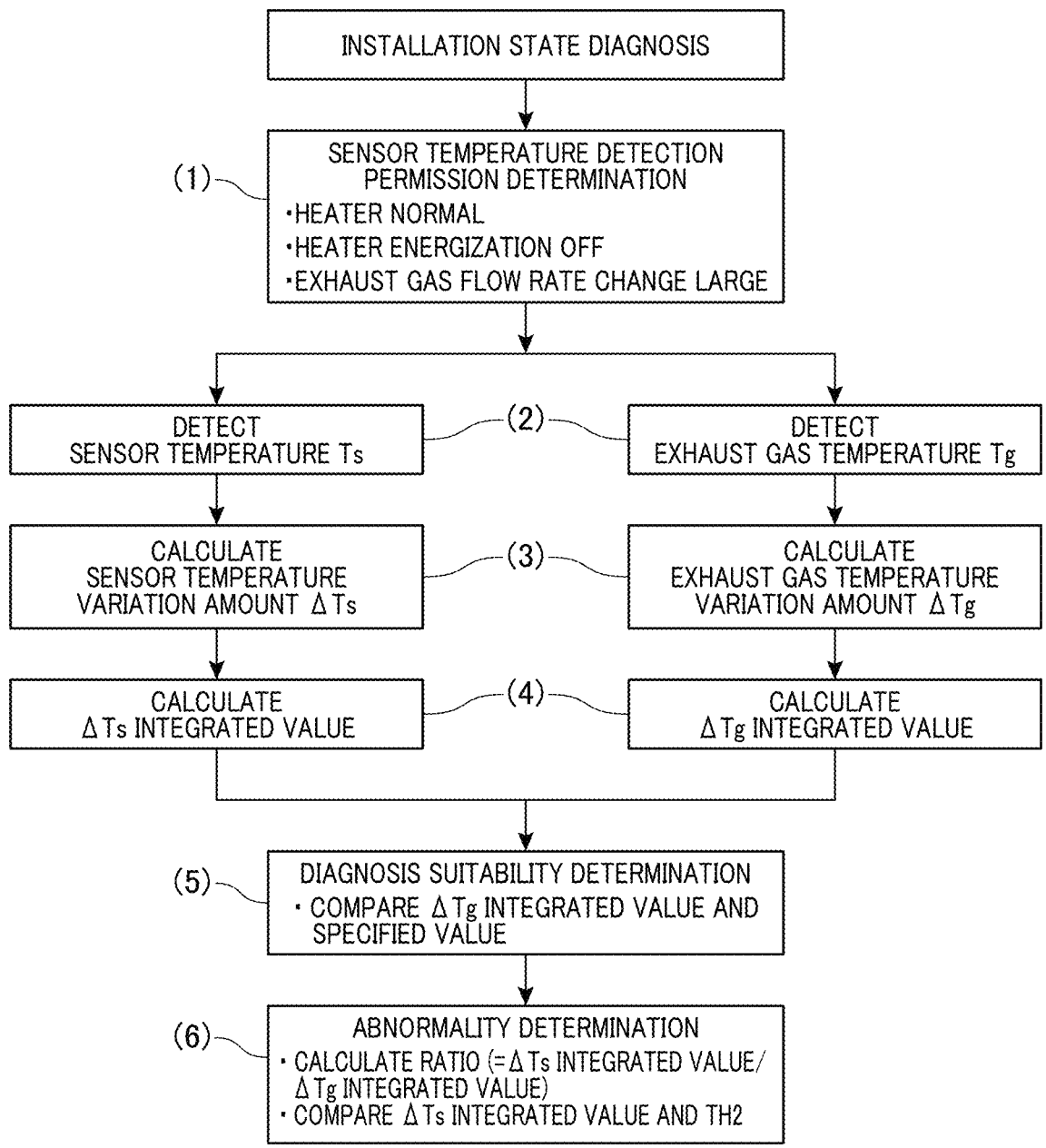
FIG. 14 is a diagram illustrating a schematic process of an installation state diagnosis section of an exhaust gas sensor according a second embodiment.
Figure 15:
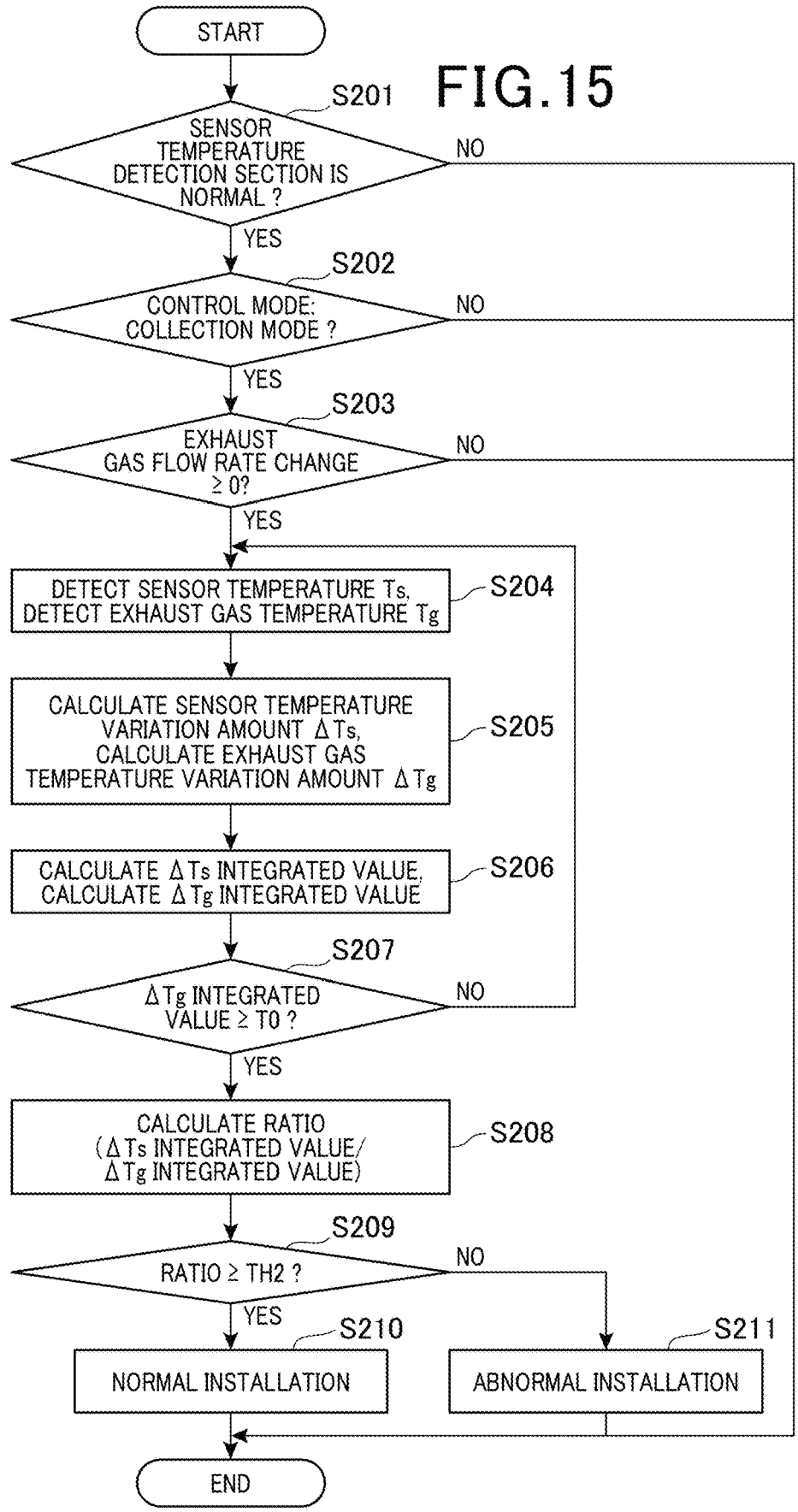
FIG. 15 is flowchart of an installation state diagnosis process performed by a diagnosis suitability determination section included in an installation state diagnosis section of the exhaust gas sensor according the second embodiment.
Figure 16:
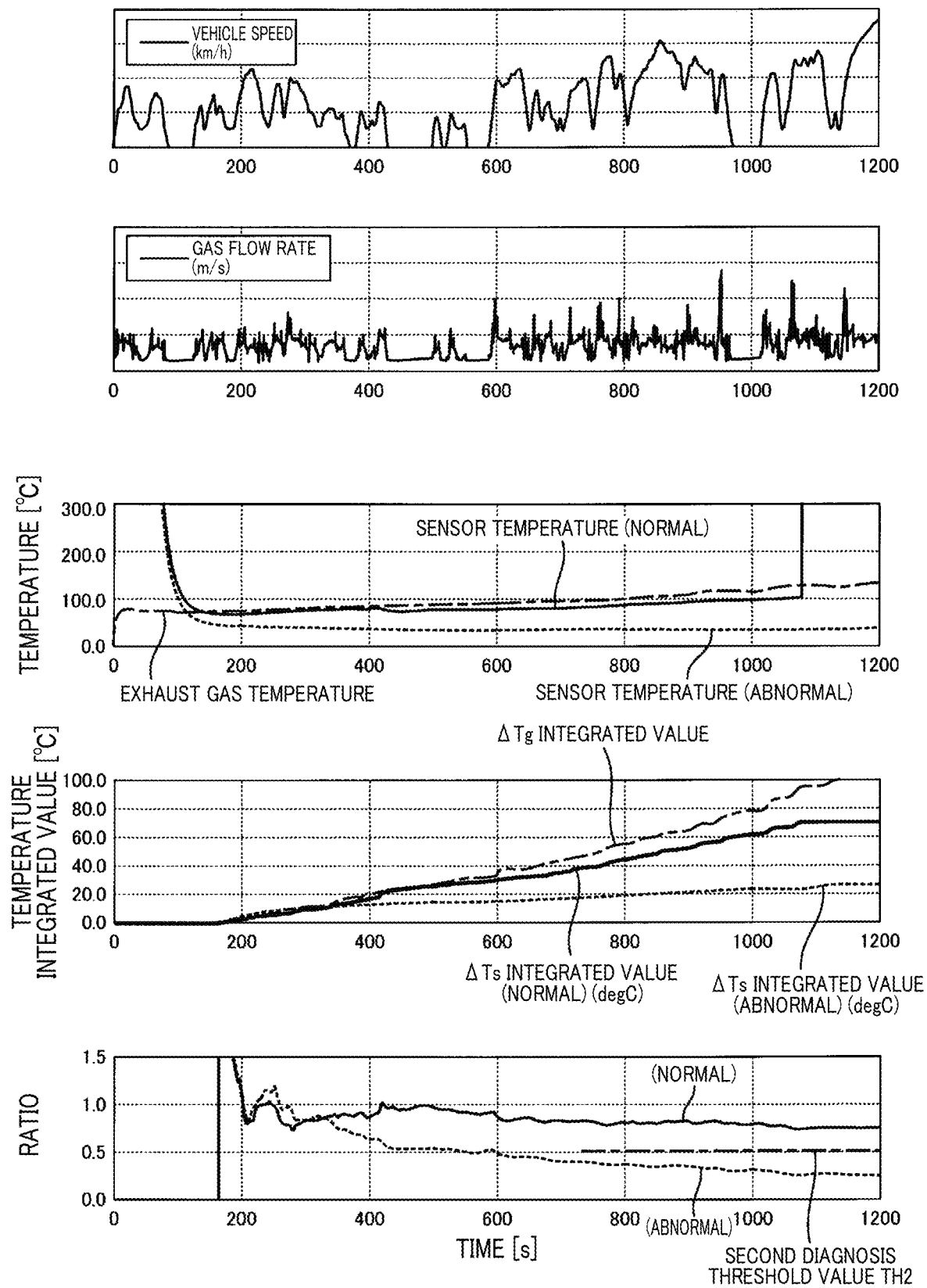
FIG. 16 is a time diagram illustrating a change of heating control by a heater section of the exhaust gas sensor and a temperature of the sensor element according the second embodiment.

With reference to FIG. 14 to FIG. 16, an exhaust gas sensor S according to the second embodiment will be described.

In the present embodiment, the basic configuration and the basic operation of the exhaust gas sensor S are similar to those of the first reference form. As shown in FIG. 14, in the summary of a procedure performed by the installation state diagnosis section 6, step (1) performed by the diagnosis suitability determination section 64 and part of step (6) performed by the abnormality determination section 63 are different from those of the first reference form.

The same reference numerals, which are used in the second embodiment, as those used in the above form indicate similar elements in the above form, unless otherwise specified.

In steps (1) to (6) of the installation state diagnosis illustrated in FIG. 14, step (3) corresponds to the temperature variation amount calculation section 61, step (4) corresponds to the temperature variation amount integration section 62, and step (6) corresponds to the abnormality determination section 63. Steps (1) and (5) correspond to the diagnosis suitability determination section 64. In step (2), the sensor temperature detection section 51 is used. Since the steps (2) to (5) are similar to those of the first reference form, descriptions thereof are omitted.

In step (1) of the present embodiment, before the calculation of the ΔTs integrated value in steps (2) to (4), when suitability of an installation state diagnosis is determined, it is desirable to determine whether an installation state diagnosis can be performed based on, in addition to the state of the sensor temperature detection section 51 and the control state of the heater control section 5, a state of exhaust gas detected by the driving state detection section 14. Specifically, as the state of the exhaust gas in the exhaust gas pipe 101, an exhaust gas flow rate is detected, and it is determined whether a change in the exhaust gas flow rate per unit time is a predetermined specified value V0 (for example, 1 m/s) or more.

In the first reference form, as in the influence of an exhaust gas flow rate described above, if a change in the exhaust gas flow in the exhaust gas pipe 101 is great, variations in the sensor body 51 and the exhaust gas temperature Tg tend to become great. In this case, also in variations in temperatures in a normal installation sate and an abnormal installation sate, the difference between the lengths of the loci of characteristic lines tends to be significant. Hence, in step (1), only when the change in the exhaust gas flow rate is great, temperature detection may be performed. When the change in the exhaust gas flow rate is small, the later steps are not performed.

In step (1), suitability of an installation state diagnosis based on the state of the sensor temperature detection section 51 and the control state of the heater control section 5 is also determined as in the first reference form. As described above, it is desirable that the temperature detection and the installation state diagnosis in step (2) and the later steps are performed only in a state suited for the installation state diagnosis. Accordingly, by previously determining suitability of performing temperature detection for an installation state diagnosis, the installation state diagnosis can be performed with higher accuracy.

In step (1), if it is determined that an installation state diagnosis can be performed, as in the first reference form, in steps (2) to (4), detection of the sensor temperature Ts, calculation of the sensor temperature variation amount ΔTs, and calculation of the ΔTs integrated value are sequentially performed. In addition, detection of the exhaust gas temperature Tg, calculation of the exhaust gas temperature variation amount ΔTg, and calculation of the ΔTg integrated value are performed. Similarly, in step (5), the calculated ΔTg integrated value is compared with the preset specified value T0 to determine suitability of an installation state diagnosis, thereby determining whether the integrated amount of the variation in the exhaust gas temperature Tg is sufficient for the diagnosis.

If the ΔTg integrated value has reached the specified value T0, in step (6), the installation state diagnosis section 6 determines presence or absence of abnormal installation based on the calculated ΔTg integrated value.

In the first reference form, the first diagnosis threshold value TH1, which is a variable value, is calculated based on the ΔTg integrated value, and is compared with the ΔTs integrated value. In the present embodiment, a ratio between the ΔTs integrated value and the ΔTg integrated value is calculated as in the following expression.

Ratio=ΔTs integrated value/ΔTg integrated value

The calculated ratio is compared with, for example, a second diagnosis threshold value TH2, which is a diagnosis threshold. As described above, a ration with reference to the ΔTg integrated value may be calculated. Thereby, a map or the like for calculating a diagnosis threshold value for an installation state diagnosis is not necessary. If the ΔTs integrated value has reached the second diagnosis threshold value TH2, a determination as a normal installation is made. If the ΔTs integrated value has not reached the second diagnosis threshold value TH2, a determination as an abnormal installation is made.

An example of the installation state diagnosis process performed by the installation state diagnosis section 6 will be described with reference to a flowchart shown in FIG. 15. The present process is repeatedly performed, for example, at a constant period.

Steps S201 to S203 in FIG. 15 correspond to step (1) in FIG. 14. Steps S204 to S206 in FIG. 15 respectively correspond to steps (2) to (4) in FIG. 14. Step S207 in FIG. 15 corresponds to step (5) in FIG. 14. Steps S208 to S209 in FIG. 15 correspond to step (6) in FIG. 14.

In FIG. 15, when the installation state diagnosis process starts, first in step S101, the installation state diagnosis section 6 determines whether the sensor temperature detection section 51 can operate normally. If an affirmative determination is made, the process proceeds to step S202, in which the installation state diagnosis section 6 determines whether the control mode of the sensor temperature Ts by the SCU 50 is a collection mode. Since steps S201 to S202 are similar to steps S101 to S102 in the first reference form, descriptions thereof are omitted.

In step S203, the installation state diagnosis section 6 acquires an exhaust gas flow rate detected by the driving state detection section 14 and determines whether a change in the exhaust gas flow rate with respect to that at the last time is specified value V0 (for example, 1 m/s) or more (that is, whether change in exhaust gas flow≥0). If an affirmative determination is made, the installation state diagnosis section 6 determined that the exhaust gas flow rate is suited for the installation state diagnosis. Then, the process proceeds to step S204. If a negative determination is made in any of steps S201 to S203, the present process ends.

In step S204, the installation state diagnosis section 6 acquires the sensor temperature Ts detected by the sensor temperature detection section 51 and the exhaust gas temperature Tg detected by the temperature sensor 103. Then, the process proceeds to step S205, in which the installation state diagnosis section 6 calculates the sensor temperature variation amount ΔTs and the exhaust gas temperature variation amount ΔTg. Furthermore, the process proceeds to step S206, in which the installation state diagnosis section 6 calculates the ΔTs integrated value and the ΔTg integrated value. Since steps S204 to S206 are similar to steps S103 to S105 in the first reference form, descriptions thereof are omitted.

Next, the process proceeds to step S207 and later steps to perform the installation state diagnosis. In step S207, as in step S106 of the first reference form, the installation state diagnosis section 6 determines whether the calculated ΔTg integrated value has become the specified value T0 or more (that is, whether ΔTg integrated value T0). If an affirmative determination is made in step S207, the process proceeds to step S208. If a negative determination is made in step S207, the process returns to step 204, and then step 204 and later steps are repeated.

In step S208, the installation state diagnosis section 6 calculates a ratio between the ΔTs integrated value and the ΔTg integrated value. Then, the process proceeds to step S209, in which the installation state diagnosis section 6 determines whether the calculated ratio has become the preset second diagnosis threshold value TH2 or more (that is, whether ratio≥TH2). If an affirmative determination is made in step S209, the process proceeds to step S210, in which the installation state diagnosis section 6 determines that the installation is normal. If a negative determination is made in step S209, the process proceeds to step S211, in which the installation state diagnosis section 6 determines that the installation is abnormal. Thereafter, the present process ends.

FIG. 16 illustrates ratios, which are obtained from the relationship between the ΔTg integrated value and the ΔTs integrated value used in a traveling mode illustrated in FIG. 10, with comparison between a normal installation state and an abnormal installation state. In this case, a temperature can be detected, and a lower limit, which considers a variation, of the ratio in a normal installation state and an upper limit, which considers a variation, of the ratio in an abnormal installation state do not overlap with each other. Variations of the lower limit and the upper limit become small when certain time has passed. In addition, the difference between the ratios become large.

Hence, by setting the second diagnosis threshold value TH2 so as to be between the lower limit of the ratio in a normal installation state and the upper limit of the ratio in an abnormal installation state, the installation state diagnosis can be performed. For example, according to the relationship illustrated in FIG. 16, when the second diagnosis threshold value TH2 is set to 0.5, if the sensor body S1 is installed normally, the calculated ratio (for example, 0.7) is larger than the second diagnosis threshold value TH2, and it is determined that the installation is normal. In contrast, if the sensor body S1 is not installed normally, for example not installed, the calculated ratio (for example, 0.3) is smaller than the second diagnosis threshold value TH2, and it is determined that the installation is abnormal.

As described above, the installation state diagnosis section 6 of the present embodiment also includes the variation amount calculation section 61 and the variation amount integration section 62 that sum the variation amounts of the sensor temperature Ts detected by the sensor temperature detection section 51 and sum the variation amounts of the sensor temperature Tg. The abnormality determination section 63 compares a ratio of the ΔTs integrated value to the ΔTg integrated value with the second diagnosis threshold value TH2, whereby whether the installation state of the sensor element 1 is normal or abnormal can be reliably determined. Before the determination of presence or absence of abnormal installation, the diagnosis suitability determination section 64 determines that the state of the heater 4, the exhaust gas flow rate, and the like are suited to detect a temperature because the integrated value of the exhaust gas temperature variation amounts ΔTg has becomes the predetermined specified value T0 or more. Thus, the installation state diagnosis can be performed with higher accuracy and higher reliability.

The present disclosure is not limited to the above-described embodiments and can be implemented with various embodiments within a scope not deviating from the gist of the present disclosure.

For example, the above embodiments have described a case in which the exhaust gas sensor S is used as a PM sensor. However, the exhaust gas sensor S may be used as not only the PM sensor but also a gas sensor such as an NOx sensor. Also in a case in which the exhaust gas sensor S is used as such a gas sensor, providing the installation state diagnosis section 6 can similarly diagnose an installation state of the sensor element 1.

In the above embodiments, an example of application of the exhaust gas sensor to an exhaust gas purification system of an engine including the DPF 102. However, the system configuration including the engine can be appropriately changed. The exhaust gas sensor can be used for not only vehicles but also various uses. The structures of the exhaust gas sensor S and the sensor element 1 also can be changed appropriately.

An aspect of the present disclosure is an exhaust gas sensor (3) that detects a specific component included in an exhaust gas of an internal-combustion engine (ENG)

The exhaust gas sensor includes:

a sensor body (S1) that holds a sensor element (1) including a detector (2) for the specific component, inside a housing (11) attached to an exhaust gas pipe (101);

an element cover (3) that accommodates the sensor element and a gas ventilation hole (31, 32) through which exhaust gas is introduced to the detector or is discharged from the detector;

a heater (4) that produces heat by energization to heat the sensor element;

a heater control section (5) that controls heating of the sensor element 1 by the heater;

a sensor temperature detection section (51) that detects a temperature of the sensor element; and an installation state diagnosis section (6) that diagnoses an installation state of the sensor body with respect to the exhaust gas pipe based on a sensor temperature (Ts) detected by the sensor temperature detection section.

The installation state diagnosis section includes a temperature variation amount calculation section (61) that calculates a variation amount (ΔTs) of the sensor temperature and a variation amount (ΔTg) of an exhaust gas temperature (Tg), a temperature variation amount integration section (62) that calculates an integrated value of the variation amounts of the sensor temperature and an integrated value of the variation amounts of the exhaust gas temperature and calculates a ratio of the integrated value of the variation amounts of the sensor temperature to the integrated value of the variation amounts of the exhaust gas temperature, and an abnormality determination section (63) that compares the ratio calculated by the temperature variation amount calculation section with a diagnosis threshold value (TH2) set as a fixed value to determine presence or absence of an abnormal installation.

The abnormality determination section determines the presence of an abnormal installation if the ratio is less than the diagnosis threshold value.

In the above exhaust gas sensor, the installation state diagnosis section calculates the variation amount of the sensor temperature detected by the sensor temperature detection section, and performs a diagnosis by using the summed variation amount integration information. Typically, an exhaust gas temperature is higher than an external temperature. Hence, in a state where the sensor element is installed normally together with the sensor body, the sensor element is exposed to the exhaust gas passing through the gas ventilation hole of the sensor element, whereby the temperature of the sensor element increases. If the exhaust gas temperature changes, the sensor temperature also changes so as to follow the exhaust gas temperature. In contrast, in a state where the sensor body is not installed normally, and the sensor element is not exposed to the exhaust gas, the temperature of the sensor element does not follow the exhaust gas temperature, and the change in the temperature of the sensor element is small.

Hence, the installation state diagnosis section performs a diagnosis of abnormality of the installation state by comparing the variation amount integration information of the sensor temperature, which is an indicator, with the diagnosis threshold value. If the installation state is normal, the variation amount of the sensor temperature follows the variation in the exhaust gas temperature and increases. If the installation state is abnormal, the variation amount of the sensor temperature decreases. In this case, although the difference between the individual variation amounts is small, the difference between the summed variation amounts in a normal state and in an abnormal state is large. Hence, setting a diagnosis threshold value based on the relationship between them can distinguish between a normal state and an abnormal state. Thus, an installation state diagnosis can be performed with high accuracy without being affected by a surrounding environment as in a conventional case.

As described above, an exhaust gas sensor can be provided which can perform a diagnosis of an installation state of a sensor element with high accuracy and has higher reliability.

What is claimed is:

1. An exhaust gas sensor that detects a specific component included in an exhaust gas of an internal-combustion engine, the exhaust gas sensor comprising:

a sensor body that holds a sensor element including a detector for the specific component, inside a housing attached to an exhaust gas pipe;

an element cover that accommodates the sensor element and a gas ventilation hole through which exhaust gas is introduced to the detector or is discharged from the detector;

a heater that produces heat by energization to heat the sensor element;

a heater control section that controls heating of the sensor element by the heater;

a sensor temperature detection section that detects a sensor temperature of the sensor element; and an installation state diagnosis section that diagnoses an installation state of the sensor body with respect to the exhaust gas pipe based on the sensor temperature detected by the sensor temperature detection section, wherein the installation state diagnosis section includes a temperature variation amount calculation section that calculates a variation amount of the sensor temperature and a variation amount of an exhaust gas temperature, a temperature variation amount integration section that calculates an integrated value of the variation amounts of the sensor temperature and an integrated value of the variation amounts of the exhaust gas temperature and calculates a ratio of the integrated value of the variation amounts of the sensor temperature to the integrated value of the variation amounts of the exhaust gas temperature, and an abnormality determination section that compares the ratio calculated by the temperature variation amount calculation section with a diagnosis threshold value set as a fixed value to determine presence or absence of an abnormal installation, and the abnormality determination section determines the presence of the abnormal installation if the ratio is less than the diagnosis threshold value.

2. The exhaust gas sensor according to claim 1, wherein the variation amount of the sensor temperature or the variation amount of the exhaust gas temperature is an absolute value of a difference value between a previous value and a current value of the sensor temperature or the exhaust gas temperature, which is periodically detected.

3. The exhaust gas sensor according to claim 1, wherein the diagnosis threshold value is previously set so as to be between a lower limit of the ratio in a normal installation state and an upper limit of the ratio in an abnormal installation state, and the abnormality determination section determines the absence of the abnormal installation if the ratio is diagnosis threshold value or more.

4. The exhaust gas sensor according to claim 1, wherein the installation state diagnosis section further includes a diagnosis suitability determination section that determines whether an installation state diagnosis is allowed, based on the integrated value of the variation amounts of the exhaust gas temperature.

5. The exhaust gas sensor according to claim 4, wherein the diagnosis suitability determination section determines that the installation state diagnosis is allowed if the integrated value of the variation amounts of the exhaust gas temperature is a specified value or more.

6. The exhaust gas sensor according to claim 4, wherein the diagnosis suitability determination section determines whether the installation state diagnosis is allowed, based on at least one of a control state of the heater control section, a state of the sensor temperature detection section, and an operational state of the internal-combustion engine.

7. The exhaust gas sensor according to claim 4, wherein the diagnosis suitability determination section determines that the installation state diagnosis is allowed, in a state in which heating by the heater is stopped by the heater control section.

8. The exhaust gas sensor according to claim 7, wherein the specific component is particulate matter, the heater control section includes a collection mode that collect the particulate matter on the detector and a regeneration mode that burns the particulate matter deposited on the detector by heating, and the state in which heating by the heater is stopped is a state in which the collection mode is selected by the heater control section.

* * * * *